(12) United States Patent
Lee

(10) Patent No.: US 9,569,381 B2
(45) Date of Patent: *Feb. 14, 2017

(54) SCHEDULER FOR MEMORY

(71) Applicant: SAMSUNG ELECTRONICS CO., LTD., Suwon-si, Gyeonggi-do (KR)

(72) Inventor: Chul Lee, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 105 days.

This patent is subject to a terminal disclaimer.

(21) Appl. No.: 14/541,298

(22) Filed: Nov. 14, 2014

(65) Prior Publication Data

US 2015/0074360 A1    Mar. 12, 2015

Related U.S. Application Data

(63) Continuation of application No. 13/484,337, filed on May 31, 2012, now Pat. No. 8,914,571.

(30) Foreign Application Priority Data

Jun. 3, 2011  (KR) .................. 10-2011-0054141

(51) Int. Cl.
G06F 13/18 (2006.01)
G06F 13/16 (2006.01)
G06F 12/06 (2006.01)

(52) U.S. Cl.
CPC ........... *G06F 13/18* (2013.01); *G06F 12/0607* (2013.01); *G06F 13/16* (2013.01); *G06F 13/1668* (2013.01)

(58) Field of Classification Search
CPC ...................................................... G06F 13/16
See application file for complete search history.

(56) References Cited

U.S. PATENT DOCUMENTS

| 5,579,452 | A | 11/1996 | Ambalavanar et al. |
| 7,240,143 | B1 | 7/2007 | Scheffler et al. |
| 8,055,816 | B2* | 11/2011 | Asnaashari ........... G06F 13/161 710/21 |
| 2003/0084255 | A1* | 5/2003 | Suzuki ................ G06F 13/1605 711/150 |
| 2007/0255904 | A1 | 11/2007 | Frank et al. |
| 2010/0268865 | A1* | 10/2010 | Ramiya Mothilal ............ G06F 12/0246 711/103 |
| 2010/0271876 | A1 | 10/2010 | Tsuji et al. |
| 2010/0287333 | A1 | 11/2010 | Lee et al. |

(Continued)

FOREIGN PATENT DOCUMENTS

| JP | 2001147855 | 5/2001 |
| JP | 2001318824 | 11/2001 |

(Continued)

*Primary Examiner* — David X Yi
*Assistant Examiner* — Zubair Ahmed
(74) *Attorney, Agent, or Firm* — Volentine & Whitt, PLLC

(57) ABSTRACT

A scheduler controls execution in a memory of operation requests received in an input request set (IRS) by providing a corresponding output request set (ORS). The scheduler includes zone standby units having a one-to-one relationship with corresponding zones such that each zone standby unit stores an operation request. The scheduler also includes an output processing unit that determines a processing sequence for the operation requests stored in the zone standby units to provide the ORS.

17 Claims, 21 Drawing Sheets

(56) References Cited

U.S. PATENT DOCUMENTS

2010/0318750 A1 12/2010 Eckert
2011/0219198 A1* 9/2011 Ping ........................ G06F 12/00
                                                                       711/154

FOREIGN PATENT DOCUMENTS

KR     1020090097906 A    9/2009
KR     1020100064562 A    6/2010

* cited by examiner

SCHEDULER FOR MEMORY

CROSS-REFERENCE TO RELATED APPLICATIONS

This application is a Continuation Application of U.S. application Ser. No. 13/484,337, filed May 31, 2012, which claims the benefit of Korean Patent Application No. 10-2011-0054141 filed on Jun. 3, 2011, the subject matter of which is hereby incorporated by reference.

BACKGROUND OF THE INVENTION

The inventive concept relates to memory devices, memory systems, and computational systems incorporating memory systems. More particularly, the inventive concept relates to memories and memory devices including a scheduler.

Contemporary memory devices operate to write data into memory and/or read data from the memory in response to operation requests received from a controller, such as a Central Processing Unit (CPU), a processor, a memory controller, etc. Within a memory system, each memory device may receive multiple operation requests. Accordingly, a specialized circuit and/or software routine hereafter referred to as "a scheduler" is provided to efficiently control the receipt and execution of multiple operation requests.

SUMMARY OF THE INVENTION

Embodiments of the inventive concept provide a scheduler capable of efficiently scheduling operation requests to be executed within a memory, such as a flash memory.

According to an aspect of the inventive concept, there is provided a scheduler operating to control execution within a memory of at least one operation request received in an input request set (IRS), wherein each operation request in the IRS includes a corresponding logical address, the memory including a plurality of zones and each zone including a plurality of blocks having neighboring logical addresses, the scheduler comprising; a plurality of zone standby units having a one-to-one relationship with the plurality of zones, wherein each of the plurality of zone standby units is respectively configured to store an operation request received in the IRS and having a logical address indicating a corresponding zone, and an output processing unit configured to determine a processing sequence of the plurality of zone standby units, receive at least one operation request stored in the plurality of zone standby units on the basis of the processing sequence, and provide an output request set (ORS) comprising the at least one operation request arranged on the basis of the processing sequence.

According to another aspect of the inventive concept, there is provided a device comprising; a memory including a plurality of zones, each zone including a plurality of blocks having neighboring logical addresses, and a scheduler operating to control execution within the memory of at least one operation request received in an input request set (IRS), wherein each operation request in the IRS includes a corresponding logical address. The scheduler includes a plurality of zone standby units having a one-to-one relationship with the plurality of zones, wherein each of the plurality of zone standby units is respectively configured to store an operation request received in the IRS and having a logical address indicating a corresponding zone, and an output processing unit configured to determine a processing sequence for the plurality of zone standby units and provide at least one operation request in sequence as an output request set (ORS), wherein the sequence of the at least one operation request in the ORS is determined by the processing sequence.

BRIEF DESCRIPTION OF THE DRAWINGS

Certain embodiments of the inventive concept will be more readily appreciated upon review of the accompanying drawings with the following detailed description. In the drawings.

DETAILED DESCRIPTION OF THE EMBODIMENTS

Reference will now be made in some additional detail to certain embodiments illustrated in the accompanying drawings. Throughout the written description and drawings, like reference numbers and labels denote like or similar elements. In this regard, the embodiments of the inventive concept may have different forms and should not be construed as being limited to only the illustrated examples.

Accordingly, the illustrated embodiments should be understood as examples selected to teach the making and use of the inventive concept.

Figure 1:
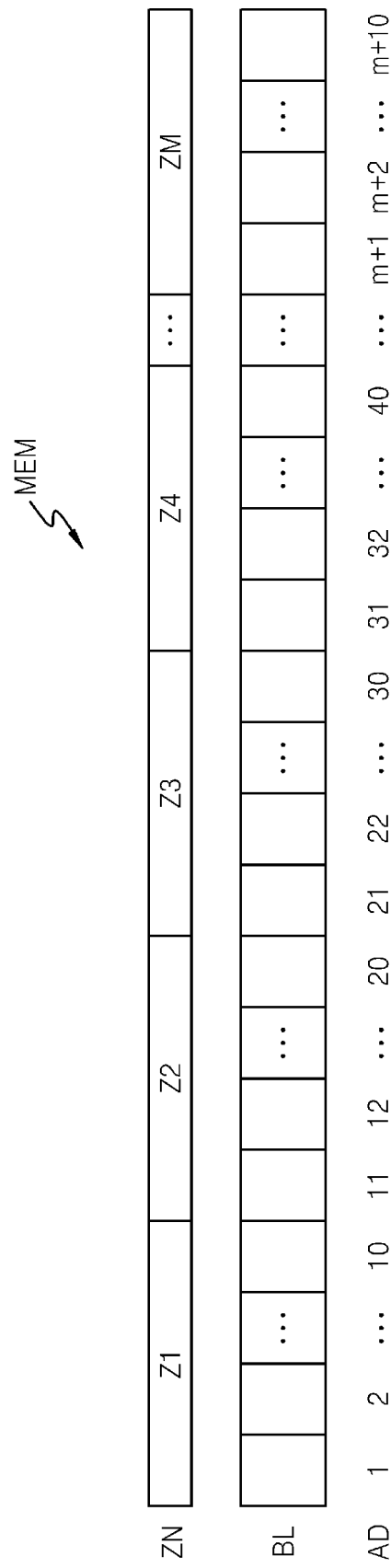
FIG. 1 illustrates one possible logical configuration for a memory included in a memory device.

Figure (FIG.) 1 illustrates one possible logical configuration for a memory (MEM) included in an exemplary memory device. As working examples, the memory of FIG. 1 may be flash memory, and the memory device including the memory may be a Solid State Drive (SSD).

Referring to FIG. 1, the memory is arranged according to a plurality of logical (or virtual) blocks (BLs). Each block BL corresponds to one logical address (AD) ranging from 1 to m+10, where m is a natural number.

Multiple blocks BLs having neighboring (e.g., sequentially proximate) logical addresses may be grouped into a zone (ZN). Therefore, the memory of FIG. 1 may be said to include a plurality of zones Z1 to ZM, where M is a natural number. Each of the zones Z1 to ZM includes a plurality of blocks BLs, and logical addresses ADs of the blocks BLs included in a particular zone are sequentially arranged to each other. Each one of the plurality of blocks BLs is included in at least one of the zones Z1 to ZM.

In the illustrated example of FIG. 1, each of the zones Z1 to ZM includes ten (10) neighboring blocks BLs, however the number of neighboring blocks included in one zone may be variously defined.

It is further assumed that each block BL is a base unit to which a particular operation request, such as a write operation or a read operation, may be directed. The write request may include a write command, address information, and write data. The read request may include a read command and address information. The address information indicates a logical address of a block BL identified by the operation request.

A memory device including the memory will perform an operation indicated by the operation request. When the operation request is a write request, the memory device performs a write operation for write data directed to a block BL having a logical address indicated by the address information in response to the write request. When the operation request is a read request, the memory device performs a read operation associated with read data obtained from a block BL having a logical address indicated by the address information in response to the read request.

Herein, for the write operation and read operation to be actually performed in the memory device, an address conversion operation may be performed to convert the logical address indicated by address information into a corresponding physical address of the memory. One possible physical configuration and relationship between a logical address and a corresponding physical address are described hereafter in some additional detail.

Figure 2:
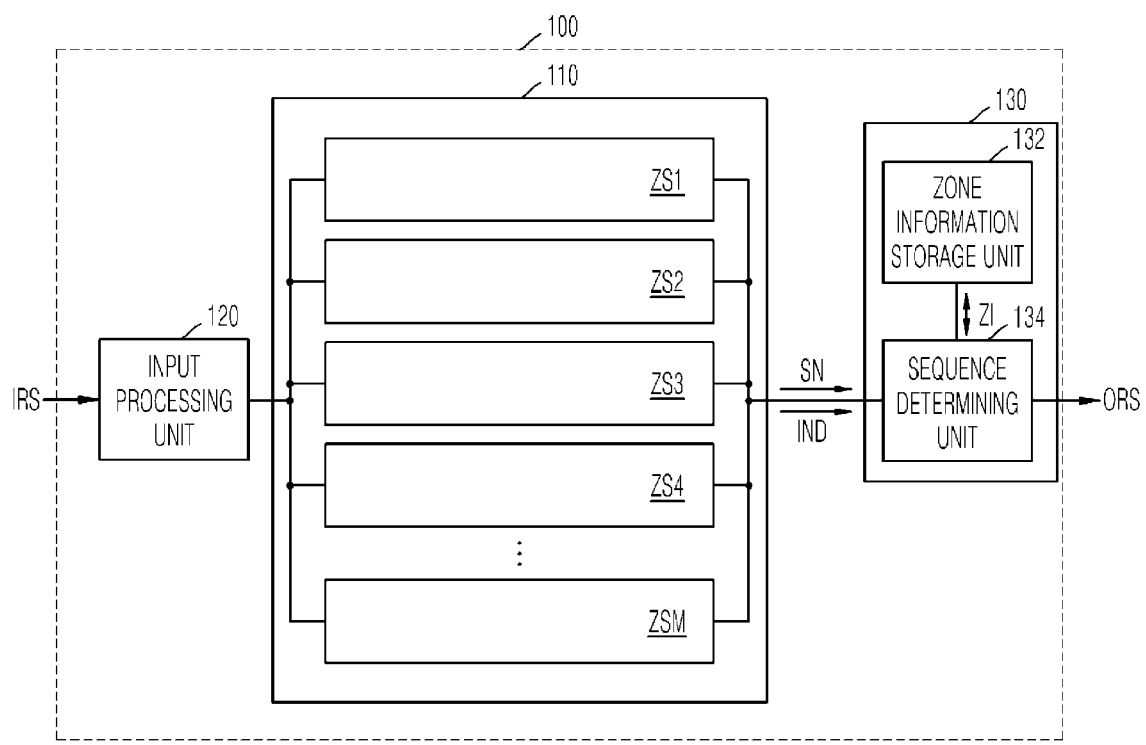
FIG. 2 is a block diagram illustrating a scheduler for a memory device according to an embodiment of the inventive concept.

FIG. 2 is a block diagram illustrating a scheduler 100 that may be used in conjunction with a memory device according to an embodiment of the inventive concept. The scheduler 100 of FIG. 2 may be used to schedule operation request(s) directed to the memory device, assumed to include the memory of FIG. 1.

Referring to FIG. 2, the scheduler 100 generally comprises a standby unit 110, an input processing unit 120, and an output processing unit 130.

The scheduler 100 receives an input request set (IRS) including at least one operation request. The scheduler 100 schedules the input request set IRS to output an output request set (ORS). The output request set ORS may include at least one operation request.

Herein, one possible scheduling approach involves determining whether to output operation request(s) included in the input request set IRS, and determining a processing sequence for the operation requests. The scheduler 100 outputs the output request set ORS, which includes operation requests possibly having their processing sequence rearranged on the basis of a scheduling result. The memory device including the memory of FIG. 1 performs an operation which corresponds to an operation request according to the processing sequence of the output request set ORS.

The operation requests included in the input request set IRS may include a write request and a read request. That is, the scheduler 100 may receive the input request set IRS in which write request(s) and/or read request(s) are randomly mixed. Further, it is possible that all the operation requests included in the input request set IRS are either write operations or read operations. That is, in certain embodiments of the inventive concept, a scheduler, such as scheduler 100, may only be used to schedule write operations and/or read operations. It is possible that one scheduler is used for only write operations, and another separately controlled scheduler is used for only read operations. However, such an independent "write scheduler" and "read scheduler" may be realized using the configuration shown in FIG. 2.

The scheduler 100 of FIG. 2 may be incorporated within a memory device that includes the memory of FIG. 1. Otherwise, the scheduler may be incorporated within an electronic apparatus having a memory device that includes the memory of FIG. 1, such as a server computer, a digital camera, a camcorder, a mobile phone, etc. In one specific embodiment of the inventive concept, the scheduler 100 of FIG. 2 may be incorporated within a SSD.

The standby unit 110 included in the scheduler 100 of FIG. 2 includes a plurality of zone standby units ZS1 to ZSM. The zone standby units ZS1 to ZSM correspond one-to-one with the zones Z1 to ZM of the memory of FIG. 1. For instance, the nth zone standby unit ZSn of FIG. 2 corresponds to the nth zone Zn of FIG. 1 (n=1, 2, . . . , M).

Each of the zone standby units ZS1 to ZSM may be used to manage operation requests in a first in first out (FIFO) manner. For instance, each of the zone standby units ZS1 to ZSM may be implemented as an operation request queue.

The input processing unit 120 receives an input request set IRS, and transfers each of the operation requests included in the input request set IRS to a corresponding zone standby unit among the zone standby units ZS1 to ZSM. The input processing unit 120 may transfer each operation request to the corresponding zone standby unit on the basis of address information included in the each operation request. In the case that the address information is a bitstream, the input processing unit 120 may determine a corresponding zone standby unit on the basis of upper bits of the bitstream.

For instance, when address information of an operation request is 12, a block BL having a logical address AD of 12 is included in the zone Z2 (refer to FIG. 1). Therefore, the operation request having address information of 12 is transferred to the zone standby unit ZS2.

The output processing unit 130 of FIG. 2 includes a zone information storage unit 132 and a sequence determining unit 134. Although the zone information storage unit 132 and the sequence determining unit 134 are shown as different circuit blocks in FIG. 2, they may be commonly integrated using a single processing unit in certain embodiments of the inventive concept.

The output processing unit 130 determines a "processing sequence" (e.g., an order of execution) for the zone standby units ZS1 to ZSM. According to the processing sequence, respective operation requests stored in the zone standby units ZS1 to ZSM are obtained by the output processing unit 130, and then output as part of the output request set ORS. Thus, the processing sequence provided by the output processing unit 130 is capable of ordering (or re-ordering) the execution order of the operation requests stored in the zone standby units ZS1 to ZSM.

In certain embodiments of the inventive concept, the output processing unit 130 determines the processing sequence for the zone standby units ZS1 to ZSM on the basis of zone information ZI and a standby number SN. The zone information ZI may, for example, indicate a zone standby unit having a last processed operation request from a sequence of operation requests defined by a previously provided output request set ORS. That is, the zone information ZI indicates a zone standby unit associated with an operation request that has been most recently output (or "last processed") among the particular operation requests of the "previously provided" output request set ORS. The standby number SN may be a number equal to the number of operation requests stored in each of the zone standby units ZS1 to ZSM. A more detailed description of this particular approach will be given in relation to FIG. 3.

Figure 3:
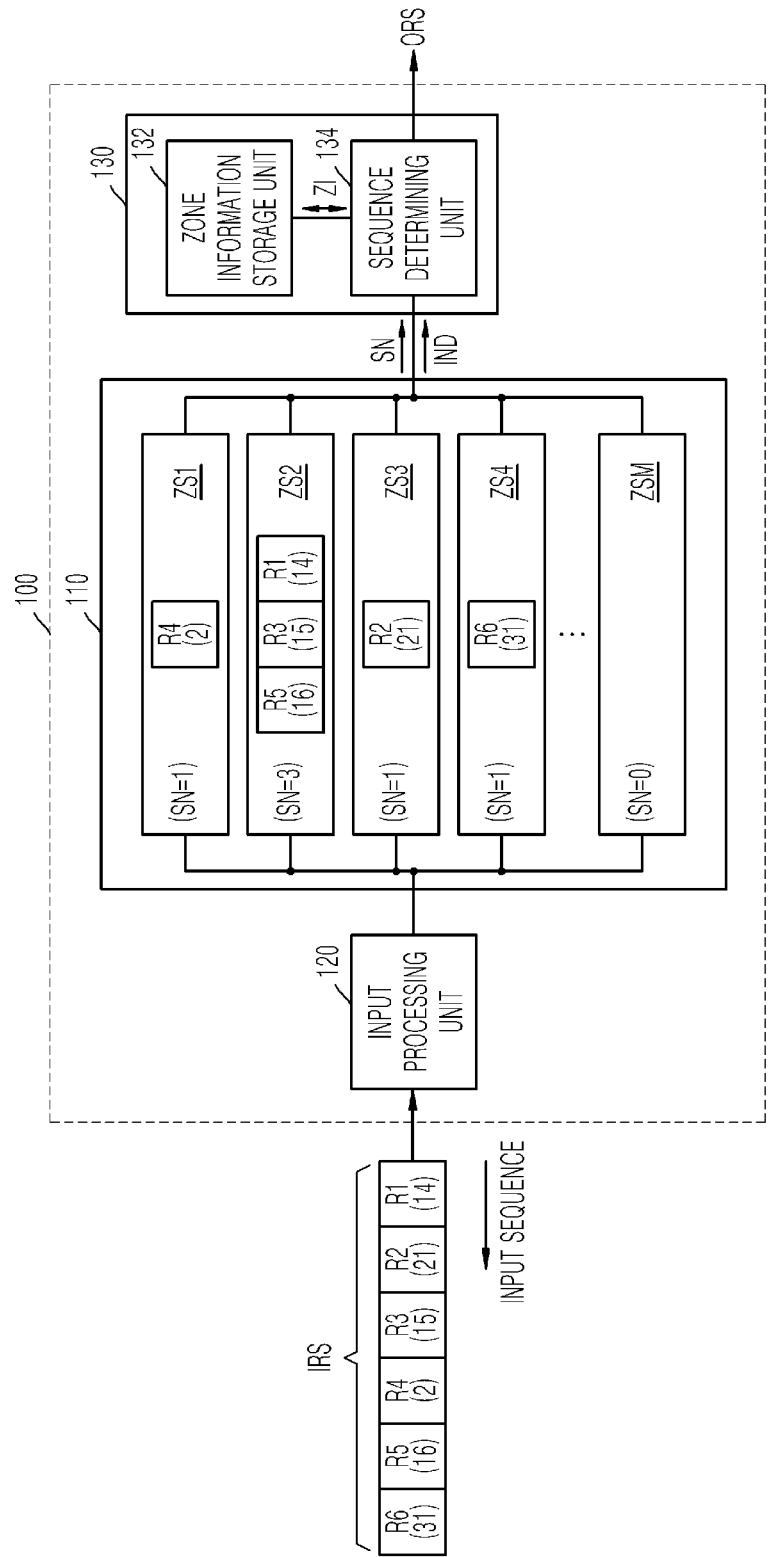
FIG. 3 illustrates one possible scheduling method that may be performed by the scheduler of FIG. 2.

FIG. 3 illustrates one possible scheduling method performed by the scheduler 100 of FIG. 2. The scheduling method described in relation to FIG. 3 may be used in a memory device including the memory of FIG. 1.

Referring to FIG. 3, an input request set IRS includes six (6) operation requests, namely, first to sixth operation requests R1 to R6. The first to sixth operation requests R1 to R6 included in the input request set IRS are sequentially input to the scheduler 100 as indicated. Each of the first to sixth operation requests R1 to R6 includes address information (i.e., the respective values shown in the parenthesizes of the IRS in FIG. 3). The address information indicates a logical address for of a particular block BL in the memory of the memory device of FIG. 1. Those skilled in the art will recognize that the use of six operation requests in FIG. 3 is merely a selected example.

As illustrated in FIG. 1, the address information of the first operation request R1 included in the input request set IRS is 14. This value is assumed to correspond to the second zone Z2. Therefore, the input processing unit 120 transfers the first operation request R1 to the second zone standby unit ZS2 which corresponds to the second zone Z2, and the first operation request R1 is stored in the second zone standby unit ZS2.

Since the address information of the second operation request R2 is 21, the second operation request R2 corresponds in the working example to the third zone Z3. Therefore, the input processing unit 120 transfers the second operation request R2 to the third zone standby unit ZS3 which corresponds to the third zone Z3, and the second operation request R2 is stored into the third zone standby unit ZS3.

In this manner, each of the first to sixth operation requests R1 to R6 included in the input request set IRS is stored in a corresponding zone standby unit on the basis of its corresponding address information.

The zone information storage unit 132 of the output processing unit 130 may be used to transfer stored zone information ZI to the sequence determining unit 134, or receive zone information ZI from the sequence determining unit 134 in order to store the received zone information ZI. The zone information ZI indicates a particular zone standby unit that previously stored the last processed operation request in the sequence of operation requests in a previously provided output request set ORS. That is, the zone information ZI indicates a zone standby unit related to an operation request which has been most recently, or lastly, processed among operation requests of the previous output request set ORS. For instance, when address information of the last processed operation request among operation requests of the previous output request set ORS provided from the sequence determining unit 134 is 28, this address corresponds to the zone Z3 (refer to FIG. 1). Therefore, the zone information ZI indicates the third zone standby unit ZS3 is last processed.

The zone information ZI will be changed (or updated) whenever an output request set ORS is provided. Therefore, after providing an output request set ORS, the sequence determining unit 134 will update the zone information ZI to indicate a zone standby unit that will be considered "last processes" in the sequence defined by the output request set ORS.

As noted above, the sequence determining unit 134 may determine the processing sequence of the zone standby units ZS1 to ZSM not only on the basis of the zone information ZI, but also on the basis of a standby number SN. The standby number SN may be the number of operation requests currently stored in each of the zone standby units ZS1 to ZSM. Drawing upon the illustrated example of FIG. 3, since the first zone standby unit ZS1 stores a single operation (R4) request, the standby number SN for the first zone standby unit ZS1 is 1. The standby number SN of the second zone standby unit ZS2 is 3, the standby number SN of the third zone standby unit ZS3 is 1, and the standby number SN of the fourth zone standby unit ZS4 is 1, etc.

The sequence determining unit 134 will determine that a particular zone standby unit indicated by the zone information ZI will be "next processed". After a 'current" zone standby unit corresponding to current zone information ZI is determined, the processing sequence for the other (non-current) zone standby units may be determined in a descending order of standby numbers. In this manner, the sequence determining unit 134 receives operation requests from the standby unit 110 according to the determined processing sequence, and then outputs the received operation requests as an output request set ORS.

Figure 4:
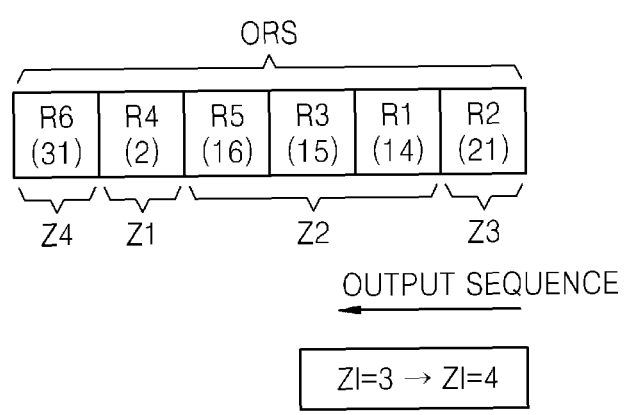
FIG. 4 further illustrates one particular output request set ORS that may be provided by the scheduler of FIG. 2 as operated in the context of scheduling method of FIG. 2.

FIG. 4 illustrates one possible output request set ORS that may be provided by the scheduler 100 of FIG. 3.

Referring collectively to FIGS. 3 and 4, a current zone information ZI is assumed to indicate the third zone standby unit ZS3 (ZI=3). This assumes, for example, that a last processed operation request in the previous output request set ORS provided by the scheduler 100 was related to the third zone standby unit ZS3. Hence, the sequence determining unit 134 determines that the third zone standby unit ZS3 indicated by the current zone information ZI should be next processed.

After the third zone standby unit ZS3 is determined to be "currently processed", it is then determined that the second zone standby unit ZS2 should be "next processed" because it has the highest standby number SN. Thereafter, however, the standby numbers SN for the first and fourth zone standby units ZS1 and ZS4 are the same, and a highest standby number SN approach cannot be used to determine a next processed zone standby unit. In such circumstances (i.e., multiple zone standby units having the same standby number SN), the processing sequence may be determined a next processed zone standby unit according to, for example, an operation request input sequence (or priority).

In the illustrated example of FIGS. 3 and 4, the input sequence priority of the fourth operation request R4 stored in the first zone standby unit ZS1 is higher than that of the sixth operation request R6 stored in the fourth zone standby unit ZS4. Therefore, the sequence determining unit 134 may determine that the first zone standby unit ZS1 should be next processed after the second zone standby unit ZS2.

Considering the standby numbers SN of all other zone standby units (i.e., all empty zone standby units), the fourth zone standby unit ZS4 will is last processed in the given output request set ORS.

To summarize the generation of an output request set ORS in relation to the examples of FIGS. 3 and 4, the operation requests included in the output request set ORS are sequentially provided in an order of zone standby units Z3, Z2, Z1, and Z4. As this output request set ORS is provided, the zone information ZI is sequentially updated to indicate a next zone standby unit until the sixth operation request R6 is lastly provided. Accordingly, when a new output request set ORS is begun, the sequence determining unit 134 will use current zone information indicating the fourth zone standby unit.

Those skilled in the art will recognize that the foregoing method is just one of many ways in which various indicia (e.g., zone information and standby numbers) may be used to rationally organize according to a given processing sequence the generation of an output request set ORS from a given input request set IRS.

Referring to FIG. 3 again, the output processing unit 130 may receive an indication signal IND from the standby unit 110, and then determine a processing sequence of the zone standby units ZS1 to ZSM to output the output request set ORS. Thus, an indication signal IND may be used to control the operation of the output processing unit 130 in generating the output request set ORS.

For instance, when a sum of standby numbers SN for the zone standby units ZS1 to ZSM becomes greater than or equal to a predetermined reference value, the standby unit 110 may transmit the indication signal IND to the output processing unit 130. Alternately, when any standby number SN for any one of the zone standby units ZS1 to ZSM becomes greater than or equal to a predetermined reference value, the standby unit 110 may transmit the indication signal IND to the output processing unit 130.

As another example, the output processing unit 130 may determine whether to generate the output request set ORS by performing a polling operation without necessarily receiving the indication signal IND. The polling operation may be performed by the output processing unit 130 to determine whether a certain number of operation request(s) have been stored in the standby unit 110. The polling operation may be periodically or aperiodically performed. For instance, the output processing unit 130 may perform the polling operation during memory system idle time (i.e., an interval during which operation requests are not being received).

As described above, the output processing unit 130 may determine a processing operation of the zone standby units ZS1 to ZSM and output the output request set ORS on the basis of the zone information ZI and the standby number SN after receiving the indication signal IND or after performing the polling operation.

If the zone information ZI is null, or the standby number SN of a zone standby unit corresponding to the zone information ZI is 0, the sequence determining unit 134 may determine a processing sequence for the zone standby units ZS1 to ZSM according to a descending order of the standby number SN.

When a processing sequence of the zone standby units ZS1 to ZSM is determined on the basis of the standby number SN, multiple zone standby units may have the same standby number SN. In this case, a processing sequence of the zone standby units ZS1 to ZSM may be determined using various methods.

For instance, as illustrated in FIG. 4, the sequence determining unit 134 may determine the processing sequence according to an input sequence. The sequence determining unit 134 may give a priority to a zone standby unit which includes an operation request precedently inputted.

As another example, when multiple zone standby units have the same standby number SN, the sequence determining unit 134 may determine a processing sequence of the zone standby units ZS1 to ZSM randomly.

As another example, when multiple zone standby units have the same standby number SN, the sequence determining unit 134 may determine a processing sequence of the zone standby units ZS1 to ZSM on the basis of information related to a previously provided output request set ORS. For instance, the processing sequence may be determined considering a zone that is frequently referenced in the previously provided output request set ORS.

As another example, when multiple zone standby units have the same standby number SN, the sequence determining unit 134 may determine the processing sequence on the basis of proximity of zones. For instance, when a (N+1)th (N is a natural number) zone standby unit is determined for the processing sequence and multiple zone standby units have the same standby number SN, a zone standby unit having a next higher (or lower) proximity value in relation to the Nth zone standby unit may be determined as the next processed zone standby unit.

As another example, when multiple zone standby units have the same standby number SN, the sequence determining unit 134 may determine the processing sequence on the basis of division and/or merger of zone standby units. The division and/or merger of zone standby units may occur when zone standby units and zones of a memory are dynamically allocated.

Hereinafter, a case of dynamically allocating zone standby units and related zones of a memory will be described with reference to FIGS. 5 and 6.

Figure 5:
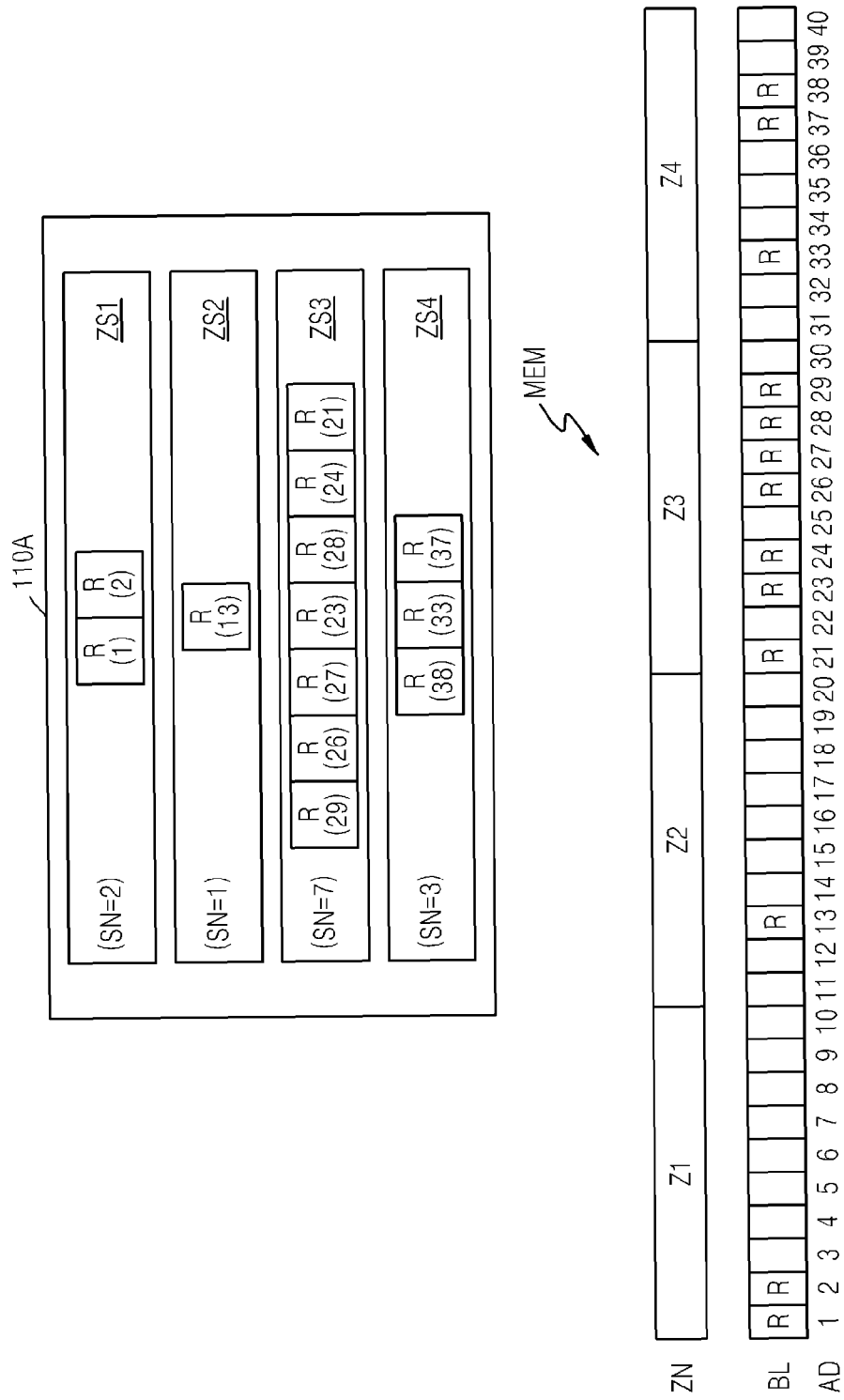
FIGS. 5 and 6 illustrate certain dynamic allocation(s) associated with the zone standby units and related memory zones of a memory according to embodiments of the inventive concept.
Figure 6:
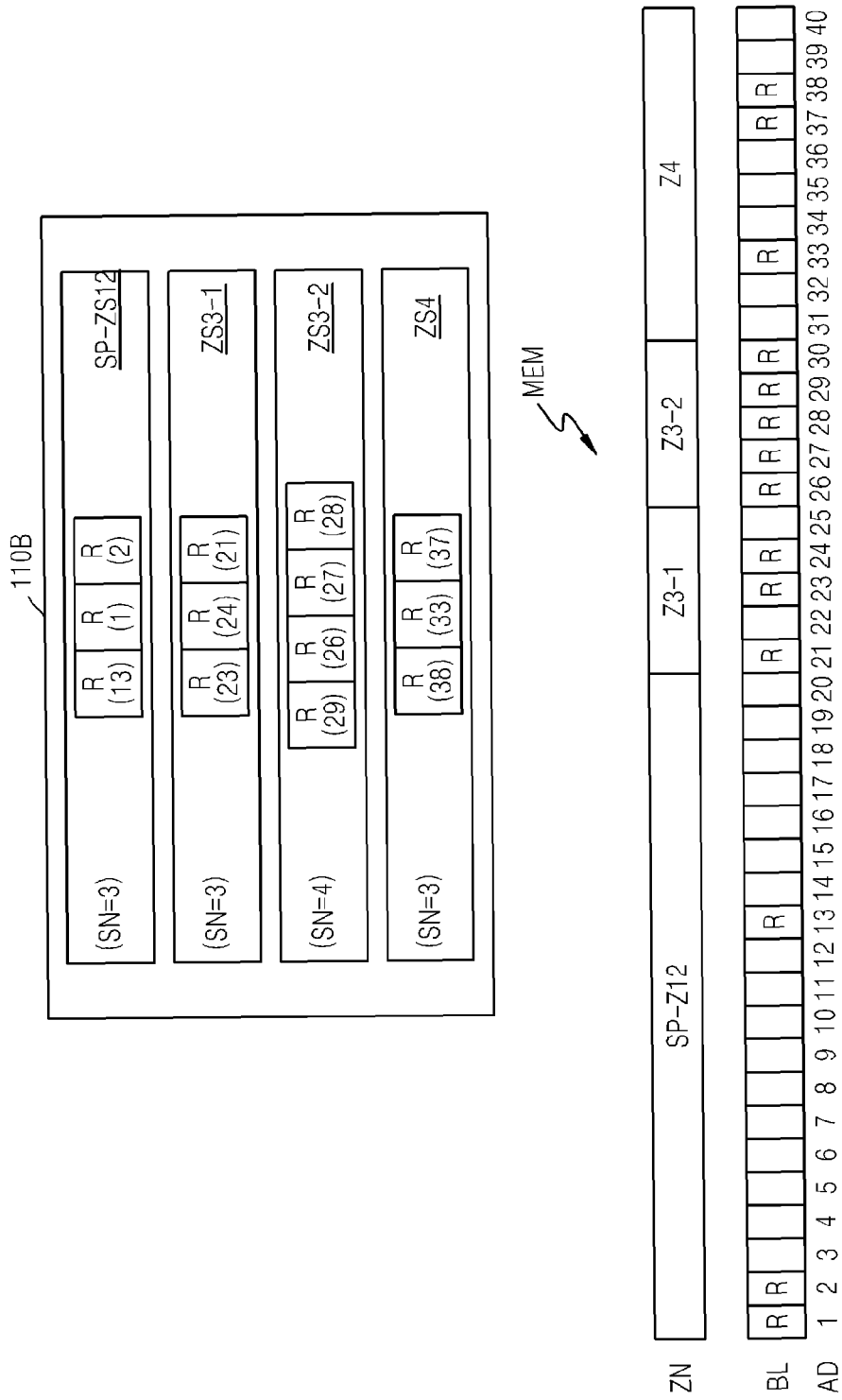

FIGS. 5 and 6 illustrate one example of dynamic allocation of zone standby unit(s) and corresponding portions of a memory. FIG. 5 illustrates an assumed "current state" of a standby unit 110A and a memory before dynamic allocation. FIG. 6 illustrates an assumed "next state" for a standby unit 110B and memory following dynamic allocation.

Referring to FIGS. 5 and 6, in the standby unit 110A, two (2) operation requests are stored in the first zone standby unit ZS1 having an SN of 2, one (1) operation request is stored in the second zone standby unit ZS2 having an SN of 1, seven (7) operation requests are stored in a third zone standby unit ZS3 having an SN of 7, and three (3) operation requests are stored in the fourth zone standby unit ZS4 having an SN of 3.

The constituent memory system is assumed to operate such that a zone standby unit having a standby number SN greater than a first reference value (e.g. 5) may be divided into a plurality of sub-zone standby units, while certain neighboring zone standby units having respective standby numbers SN less than a second reference value (e.g. 3) may be merged into a super-zone standby unit.

Following this operating premise, the standby number SN of the third zone standby unit ZS3 corresponding to zone Z3 of the standby unit 110A is greater than the first reference value (e.g. 5). Therefore, the third zone standby unit ZS3 of FIG. 5 may be divided into the two (2) sub-zone standby units ZS3-1 and ZS3-2 of FIG. 6. Also, the third zone Z3 of the memory that corresponds to the third zone standby unit ZS3 of FIG. 5 may be similarly divided into the two (2) sub zones Z3-1 and Z3-2 as illustrated in FIG. 6.

Each standby number SN of the first and second zone standby units ZS1 and ZS2 is less than the second reference value (e.g. 3), and the zone standby units ZS1 and ZS2 are sequentially adjacent to each other. Therefore, the first and second zone standby units ZS1 and ZS2 may be merged into a first super-zone standby unit SP-ZS12. Also, the first and second zones Z1 and Z2 of the memory of FIG. 5 will be merged into a first super-zone SP-Z12 as illustrated in FIG. 6.

As illustrated in FIGS. 5 and 6, when operation requests R are concentrated on a particular zone, a zone standby unit corresponding to the particular zone may be divided. Also, when operation requests R rarely occur in a particular zone, the particular zone may be merged with another zone. As described above, zone standby units and zones of the memory may be dynamically allocated in view of the standby numbers SN associated with the zone standby units.

Hereinafter, when zone standby units are dynamically allocated, a merged zone standby unit is referred to as a super-zone standby unit, a divided zone standby unit is referred to as a sub-zone standby unit. Non-merged and non-divided zone standby units are simply referred to as a "normal" zone standby unit.

When multiple zone standby units have the same standby number SN, the processing sequence may be determined on the basis of division and/or merger of zone standby units. Since a sub-zone standby unit is a divided zone standby unit because of concentration of operation requests, a sub-zone standby unit may be processed prior to a normal zone standby unit and a super-zone standby unit. On the contrary, since a super-zone standby unit is a merged zone standby unit because of infrequency of operation request, the super-zone standby unit may be processed later than a normal zone standby unit. That is, the processing sequence may be determined in the order of sub-zone standby unit, normal zone standby unit, and super-zone standby unit.

Although it has been described with reference to FIGS. 5 and 6 that zone standby units are dynamically allocated, zone standby units may be statically allocated regardless of the standby number of zone standby units.

It has been assumed till now that a scheduler will determine a processing sequence for a plurality of zone standby units on the basis of the zone information ZI and standby number SN. However, schedulers according to embodiments of the inventive concept may determine a particular processing sequence for a plurality of zone standby units using other or additional criteria.

Figure 7:
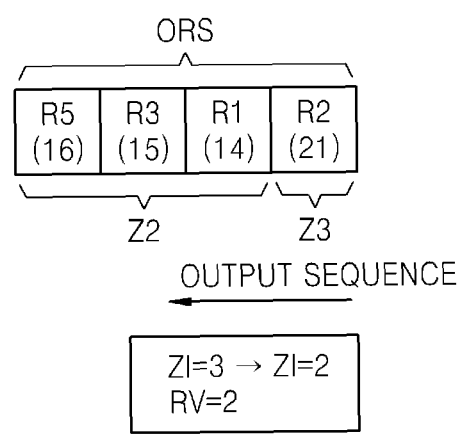
FIG. 7 illustrates one possible output request set ORS that may be provide by the scheduler of FIG. 3.

FIG. 7 illustrates another output request set ORS possibly provided by the scheduler 100 of FIG. 3.

Referring to FIGS. 3 and 7, the zone information ZI indicates the zone standby unit ZS3 (ZI=3). This is according to the assumption that the last processed operation request of a previous output request set ORS provided by the scheduler 100 was related to the third zone standby unit ZS3. Accordingly, the sequence determining unit 134 determines that the third zone standby unit ZS3 as indicated by the zone information ZI will be currently processed.

After processing the third zone standby unit ZS3, the output processing unit 130 may process only zone standby units having standby numbers SN greater than a reference value RV. When multiple zone standby units have standby numbers SN greater than the reference value RV, the processing sequence may be determined according to a descending order of standby numbers SN.

For a zone standby unit having a standby number SN less than or equal to the reference value RV, an additional operation request is awaited. Therefore, an operation request stored in the zone standby unit having a standby number SN is less than or equal to than the reference value RV may not be immediately provided, but may be processed together with later input and additional operation request(s). The reference value RV may be variously set considering scheduling efficiency.

It is assumed that the reference value RV is 2 in FIG. 7. Therefore, after the third zone standby unit ZS3, the second zone ZS2 having a standby number SN greater than the reference value RV is determined to be next processed.

In FIG. 7, only the second zone standby unit ZS2 has the standby number SN greater than the reference value RV. Although the standby number SN of the third zone standby unit ZS3 is less than the reference value RV, the third zone standby unit ZS3 indicated by the current zone information ZI, and thus, is determined to be firstly processed.

In brief, the operation requests included in the output request set ORS are sequentially provided corresponding to the zones Z3 and Z2. In FIG. 7, even after the output request set ORS is processed, non-processed operation requests remain in the first and fourth zone standby units ZS1 and ZS4. If the output request set ORS is provided, the zone information ZI is updated to indicate the zone standby unit ZS2 related to the lastly outputted fifth operation request R5. The sequence determining unit 134 may transmit the updated zone information (ZI=2) to the zone information storage unit 132.

As described above, the scheduler 100 may determine the processing sequence of the zone standby units ZS1 to ZSM on the basis of the zone information ZI and the standby number SN greater than the reference value RV.

However, additional operation requests may not be continuously input to a non-processed zone standby unit due to its low standby number SN, less than the reference value RV. In this case, the processing of an operation request may be excessively delayed. This excessive process delaying phenomenon in sometimes referred to as "starvation". To prevent starvation, a deadline (or time out) may be built into an operation request.

Hereinafter, a case configuring a deadline for an operation request will be described in some additional detail with reference to FIGS. 8 and 9.

Figure 8:
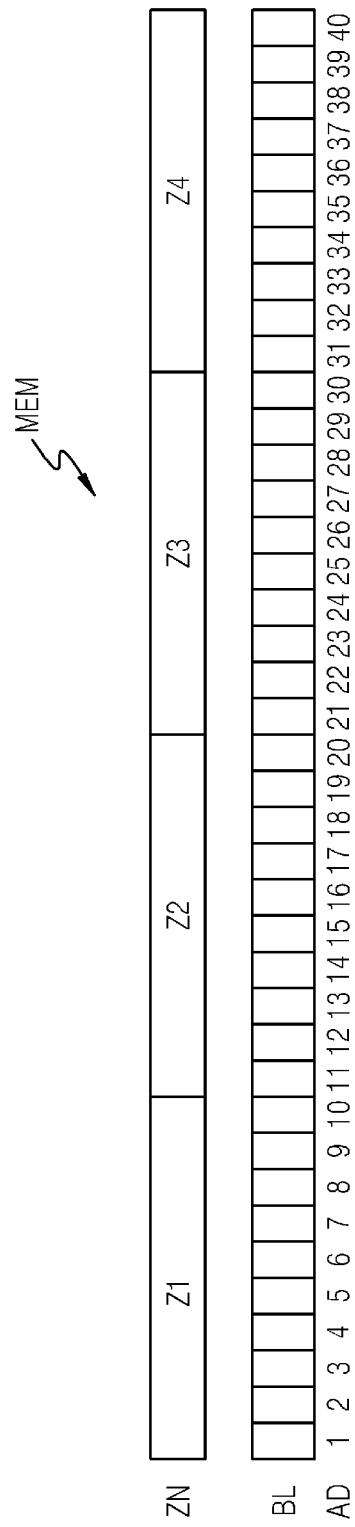
FIG. 8 illustrates another possible logical configuration for a memory included in a memory device.

FIG. 8 illustrates another exemplary logical configuration for the memory (MEM) included in a memory device like the one in FIG. 1. Referring to FIG. 8, the memory includes only four (4) zones Z1 to Z4 (i.e., M=4) for clarity and simplicity of description.

Figure 9:
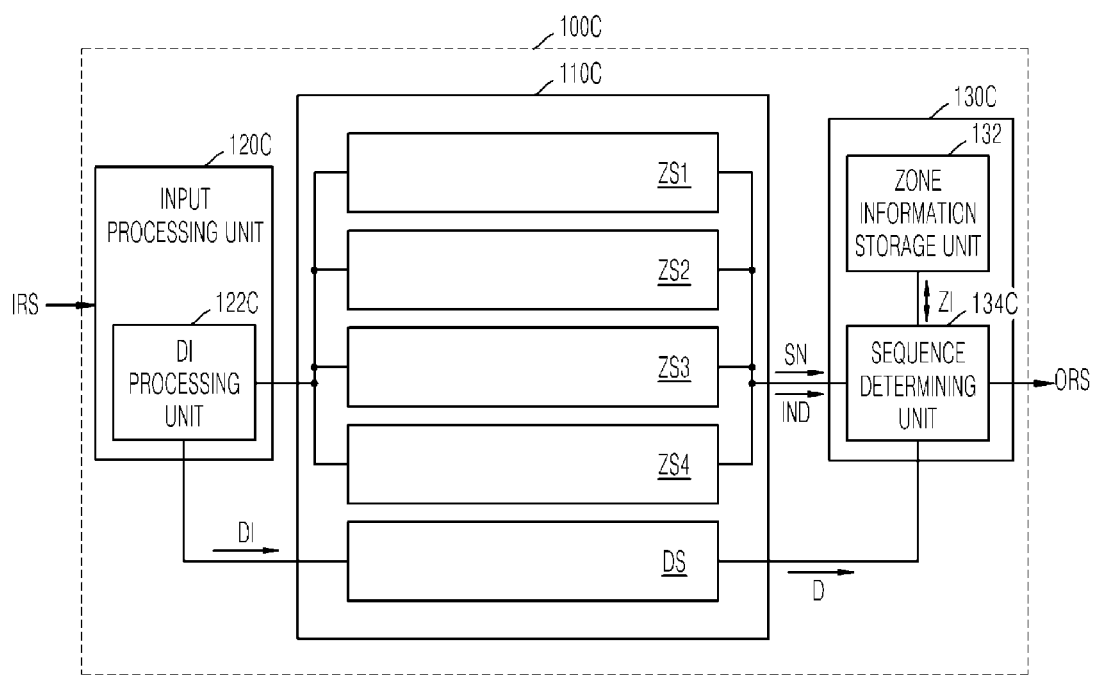
FIG. 9 is a block diagram illustrating a scheduler according to another embodiment of the inventive concept.

FIG. 9 is a block diagram illustrating a scheduler 100C according to another embodiment of the inventive concept. The scheduler 100C of FIG. 9 is used for scheduling operation request(s) to a memory device including the memory of FIG. 8. The scheduler 100C of FIG. 9 includes many of the components previously described in relation to the scheduler 100 of FIG. 2.

Referring to FIG. 9, the scheduler 100C includes a standby unit 110C, an input processing unit 120C, and an output processing unit 130C.

The input processing unit 120C includes a deadline information processing unit 122C. The standby unit 110C includes a dead line standby unit DS and four zone standby units ZS1 to ZS4 which one-to-one correspond to the four zones Z1 to Z4 of FIG. 8.

The operation requests included in the input request set IRS may further include deadline information DI. The deadline information DI indicates a deadline of an operation request. The deadline prevents starvation of an operation request and guarantees a starting service time for an operation request. The deadline may be a time limit for outputting an operation request from the scheduler 100C, or a time limit for starting an operation corresponding to an operation request in the memory of FIG. 8.

All operation requests included in the input request set IRS may include the deadline information DI, or just a portion of the operation requests may include the deadline information DI.

The deadline information processing unit 122C extracts the deadline information DI included in an operation request, and transfers the deadline information DI to the deadline standby unit DS. The deadline standby unit DS stores the deadline information DI. When the deadline standby unit DS stores a plurality of pieces deadline information DI, the pieces of deadline information DI may be arranged according to expiration of a deadline.

The deadline information DI stored in the deadline standby unit DS may be deleted when a zone standby unit, which includes an operation request corresponding to the deadline information DI, is processed.

The sequence determining unit 134C may determine the processing sequence of the zone standby units ZS1 to ZSM on the basis of the zone information ZI, standby number SN, and deadline information DI.

When there is no operation request facing an imminent deadline, a zone standby unit indicated by the zone information ZI is determined to be next processed, and following next processed priorities may be determined for zone standby units having standby numbers SN greater than a reference value on the basis of the standby numbers SN.

When there is an operation request facing an imminent deadline, a priority of a zone standby unit, in which the operation request facing an imminent deadline is stored, is determined on the basis of the deadline information DI regardless of the zone information ZI, standby number SN, and reference value. The priority of other zone standby units—absent an operation request having an imminent deadline—will be normally determined according to zone information ZI and standby number SN.

When there is an imminent deadline information DI among the pieces of deadline information DI stored in the deadline standby unit DS, the imminent deadline information DI may be transferred to the sequence determining unit 134C.

Alternately, the sequence determining unit 134C may determine whether there is an operation request facing an imminent deadline by checking the deadline information DI stored in the deadline standby unit DS by performing a polling operation. The polling operation may be periodically or aperiodically performed on the deadline standby unit DS. For instance, the polling operation may be performed at an idle time.

As described above, the output processing unit 130C may process a zone standby unit, in which an operation request facing an imminent deadline is stored, even though the standby number SN thereof is less than or equal to the reference value. Therefore, starvation due to a delayed operation request may be prevented.

Figure 10:
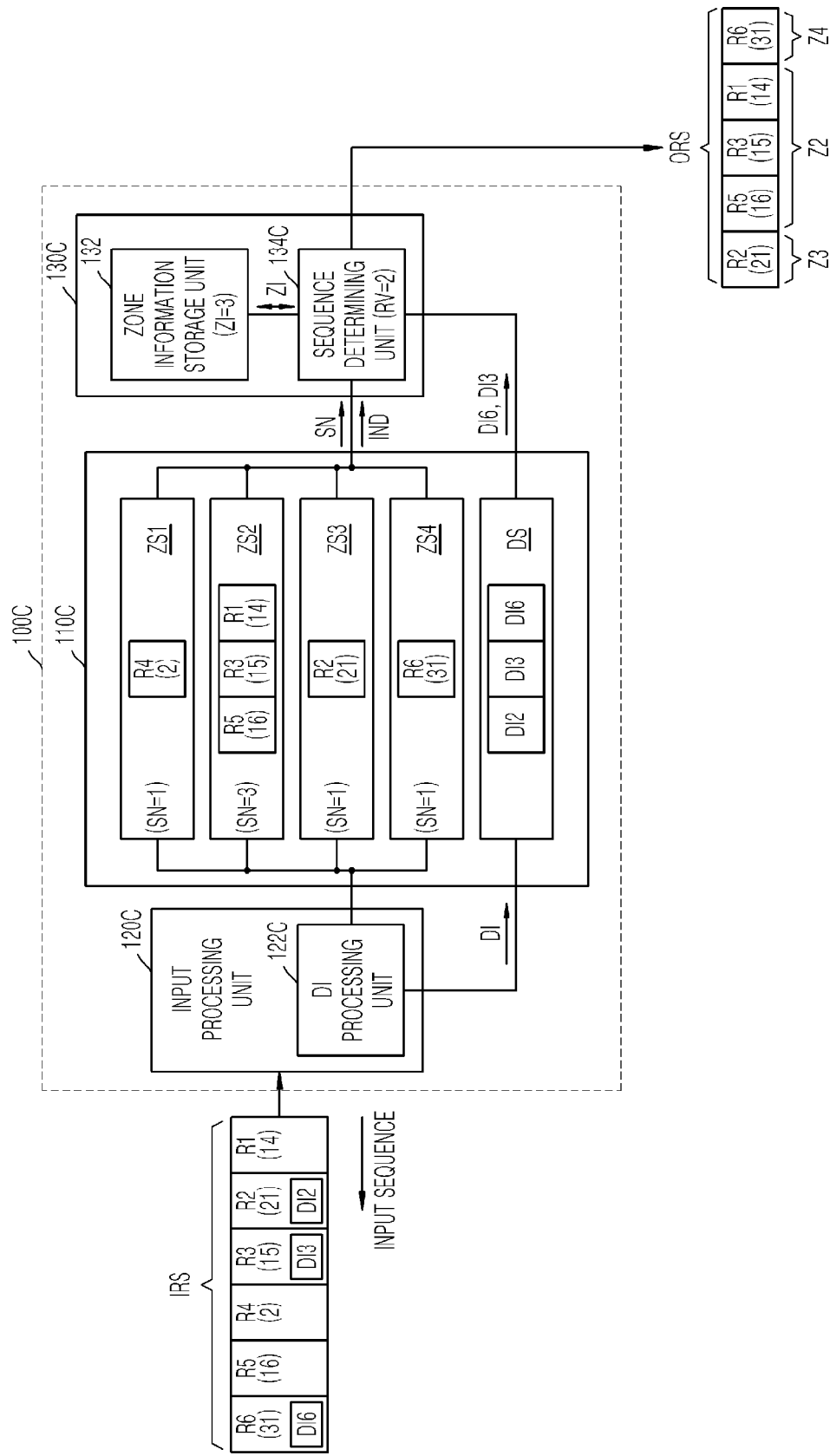
FIG. 10 illustrates one possible scheduling method that may be performed by the scheduler of FIG. 9.

FIG. 10 illustrates an one possible scheduling method that may be performed by the scheduler 100C of FIG. 9. The scheduling method of FIG. 10 may be used for scheduling an operation request for a memory device including the memory of FIG. 8.

Referring to FIG. 10, an input request set IRS includes six operation requests as before except some of the operation requests include respective deadline information. The deadline information processing unit 122C of the input processing unit 120C extracts the pieces of deadline information DI2, DI3, and DI6 from the second, third, and sixth operation requests R2, R3, and R6, and transfers the extracted pieces of deadline information DI2, DI3, and DI6 to the deadline standby unit DS.

The deadline standby unit DS may arrange the pieces of deadline information DI2, DI3, and DI6 according to expiration of a deadline. Although it is assumed in FIG. 8 that deadlines expire in the order of sixth deadline information DI6, third deadline information DI3, and second deadline information DI2, this is just an example for convenience.

The input processing unit 120C respectively transfers the first to sixth operation requests R1 to R6 included in the input request set IRS to corresponding zone standby units ZS1 to ZS4 on the basis of address information.

The sequence determining unit 134C determines the processing sequence of the zone standby units ZS1 to ZS4 on the basis of the zone information ZI, standby number SN, and deadline information DI.

In FIG. 10, it is assumed that the zone information ZI indicates the third zone standby unit ZS3 (ZI=3), and the reference value RV is 2 (RV=2). Also, the pieces of deadline information DI6 and DI3 respectively indicate that deadlines of the sixth and third operation requests R6 and R3 are imminent.

The sequence determining unit 134C may recognize that deadlines are imminent in the order of the sixth and third operation requests R6 and R3 by virtue of the pieces of deadline information DI6 and DI3. Therefore, the sequence determining unit 134C determines that the fourth zone standby unit ZS4 storing the sixth operation request R6 should be first processed, and the second zone standby unit ZS2 storing the third operation request R3 should be next processed thereafter. Then, the sequence determining unit 134C determines that the third zone standby unit ZS3 should be next processed according to the zone information ZI. Then, the sequence determining unit 134C determines a processing sequence according to the standby number SN. However, there is no zone standby unit of which a standby number SN is greater than the reference value RV (RV=2). Therefore, the third zone standby unit ZS3 will be last processed.

In brief, the operation requests included in the output request set ORS are sequentially provided corresponding to the zones Z4, Z2, and Z3. If the output request set ORS is output, the zone information ZI will be updated to indicate the third zone standby unit ZS3 related to the last output second operation request R2 (i.e., ZI=3). However, because the zone information ZI indicates the zone standby unit ZS3 before the update, the zone information ZI is not changed.

As described above, by using the deadline information DI, even a zone standby unit which is not indicated by the zone information ZI and has the standby number SN less than or equal to the reference value RV may be processed before exceeding an imminent deadline. Hence, the starvation of a particular operation request may be prevented.

Figure 11:
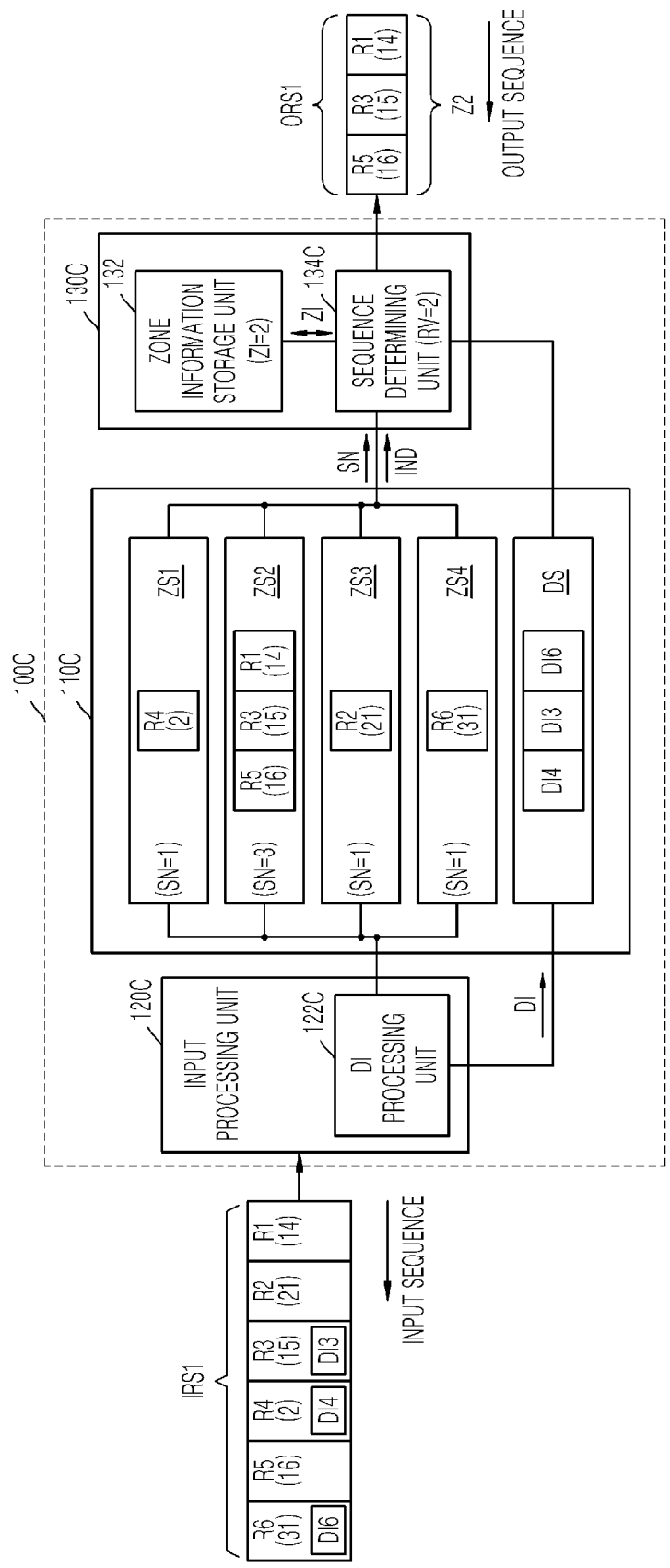
FIGS. 11, 12 and 13 collectively illustrate another scheduling method that may be performed by the scheduler of FIG. 9.
Figure 12:
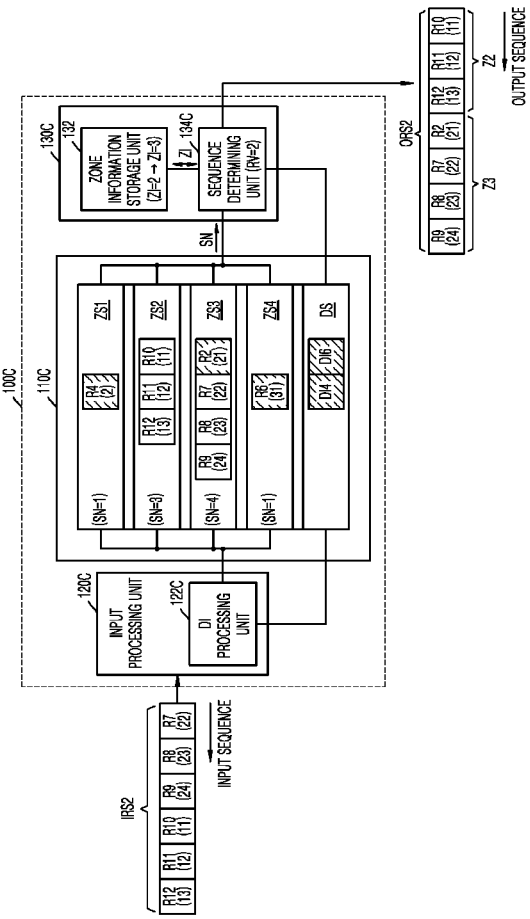
Figure 13:
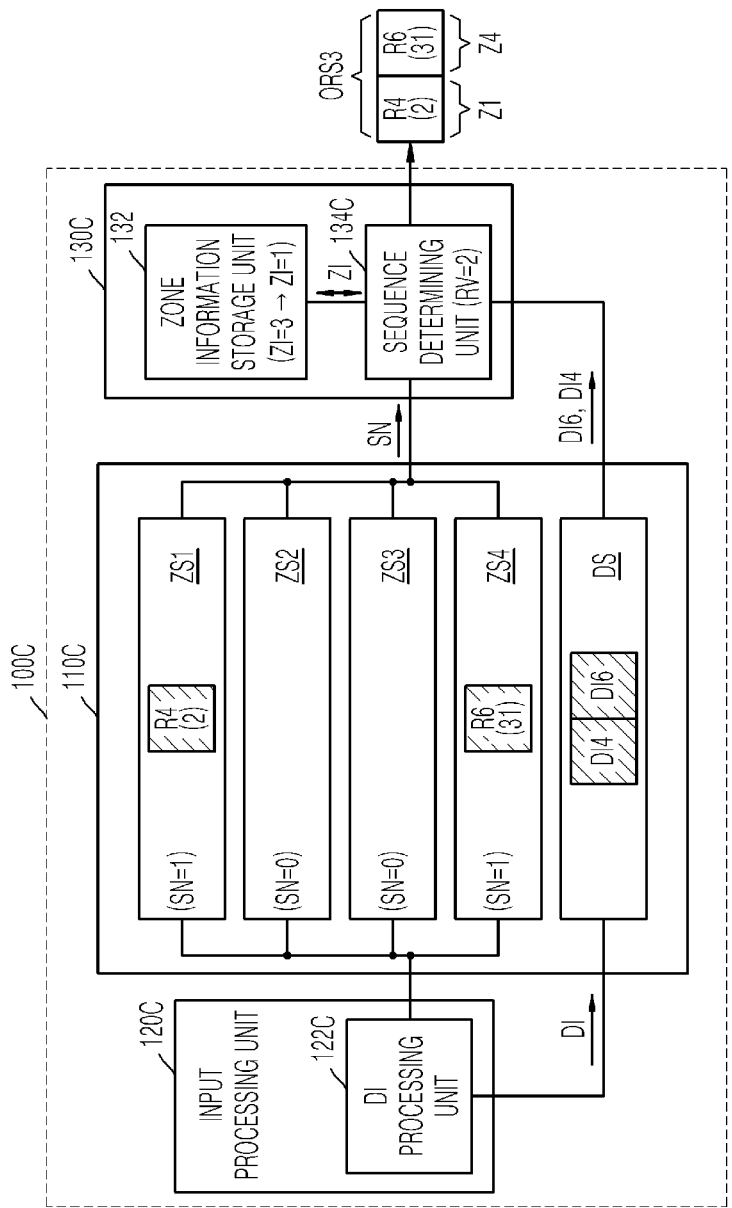

FIGS. 11, 12 and 13 collectively illustrate another scheduling method that may be performed by the scheduler 100C of FIG. 9. The scheduling method of FIGS. 11, 12 and 13 may be used by a memory device including the memory of FIG. 8. It is assumed that the reference value RV is 2 in FIGS. 11, 12 and 13.

Referring to FIG. 11, a first input request set IRS1 includes six operation requests, namely, first to sixth operation requests R1 to R6. Each of the first to sixth operation requests R1 to R6 included in the first input request set IRS1 includes address information, and the third, fourth, and sixth operation requests R3, R4, and R6 respectively further include associated deadline information DI3, DI4, and DI6.

The deadline information processing unit 122C of the input processing unit 120C extracts the deadline information DI3, DI4, and DI6 from the third, fourth, and sixth operation requests R3, R4, and R6, and transfers the extracted deadline information DI3, DI4, and DI6 to the deadline standby unit DS.

In FIG. 11, it is assumed that deadlines expire in the order of DI6, DI3, and DI4. Thus, the deadline standby unit DS will arrange the deadline information received as DI3, DI4, and DI6 according to expiration—DI6, DI3 and DI4.

The input processing unit 120C respectively transfers the first to sixth operation requests R1 to R6 included in the first input request set IRS1 to corresponding zone standby units ZS1 to ZS4 on the basis of address information.

In FIG. 11, it is assumed that the zone information ZI indicates that the second zone standby unit ZS2 (ZI=2) is current, and there is no operation request having an imminent deadline.

Hence, the sequence determining unit 134C determines that the second zone standby unit ZS2 is first processed on the basis of the zone information ZI. Then, the sequence determining unit 134C determines a processing sequence according to the standby number SN. However, there is no zone standby unit having a standby number SN is greater than the reference value RV (RV=2). The second zone standby unit ZS2 is last processed.

Since the second zone standby unit ZS2, that stores the third operation request R3 has been processed, the deadline information DI3 corresponding to the third operation request R3 is deleted from the deadline standby unit DS.

Accordingly, the first output request set ORS1 includes only the first, third, and fifth operation requests R1, R3, and R5 stored in the ("current" as indicated by the zone information ZI) second zone standby unit ZS2. Once the first output request set ORS1 is provided, the zone information ZI will be updated to indicate the second zone standby unit ZS2 related to the lastly output fifth operation request R5 (ZI=2). However, because the zone information ZI indicates the second zone standby unit ZS2 before the update, the zone information ZI is not changed.

Referring now to FIG. 12, a second input request set IRS2 includes six operation requests, namely, seventh to twelfth operation requests R7 to R12. There may be idle time between the first input request set IRS1 of FIG. 11 and the second input request set IRS2 of FIG. 12. Hence, the scheduler 100C may receive the second input request set IRS2 after lapse of the idle time following receipt of the first input request set IRS1.

It is further assumed that the seventh to twelfth operation requests R7 to R12 included in the second input request set IRS2 do not include deadline information.

The input processing unit 120C respectively transfers the seventh to twelfth operation requests R7 to R12 included in the second input request set IRS2 to corresponding zone standby units ZS1 to ZS4 on the basis of address information.

The standby unit 110C stores the second input request set IRS2 received from the input processing unit 120C. Also, the fourth, second, and sixth operation requests R4, R2, and R6 (hatched in the drawings), which have not been processed, among the operation requests included in the first input request set IRS1 of FIG. 11 are stored in the zone standby units ZS1 to ZS4.

Also, the deadline information DI6 and DI4 (hatched in the drawings) related to the non-processed operation requests of the first input request set IRS1 is stored in the deadline standby unit DS.

In FIG. 12, it is assumed that no operation request has an imminent deadline according to the deadline information DI4 and DI6. Referring to FIG. 11, the fifth operation request R5 lastly output among the operation requests of the first output request set ORS1 is related to the second zone standby unit ZS2. Therefore, the zone information ZI indicates the second zone standby unit ZS2 (ZI=2).

The sequence determining unit 134C determines that the second zone standby unit ZS2 should be first processed on the basis of the zone information ZI. Then, the sequence determining unit 134C determines a processing sequence according to standby numbers SN. The third zone standby unit ZS3 has a standby number SN greater than the reference value RV (RV=2). Accordingly, the sequence determining unit 134 determines that the third zone standby unit ZS3 should be next processed. The standby numbers SN of the first and fourth zone standby units ZS1 and ZS4 are less than or equal to the reference value RV, and thus, the first and fourth zone standby units ZS1 and ZS4 are not processed.

In view of the foregoing, the operation requests included in the second output request set ORS2 are sequentially provided from zones Z2 and Z3. Once the second output request set ORS2 is provided, the zone information ZI is updated to indicate the third zone standby unit ZS3 related to the last output ninth operation request R9 (ZI=3).

Referring to FIG. 13, the scheduler 100C does not immediately receive an input request set IRS following provision of the second output request set ORS2. That is, following operation of the scheduler 100C in relation to the second input request set IRS2 of FIG. 12, the constituent memory system enters idle time.

The fourth and sixth operation requests R4 and R6 (hatched in FIG. 13) that have not yet been processed from among the operation requests included in the first and second input request sets (IRS1 of FIG. 11 and IRS2 of FIG. 12) are still stored respectively in the first and fourth zone standby units ZS1 to ZS4 of the standby unit 110C. Also, the deadline information DI6 and DI4 (also hatched in FIG. 13) related to the non-processed operation requests from previous input request sets are still stored in the deadline standby unit DS.

In FIG. 13, it is assumed that deadlines are imminent in the order of the sixth and fourth operation requests R6 and R4 according to the pieces of deadline information DI6 and DI4.

The sequence determining unit 134C determines that the fourth zone standby unit ZS4 storing the sixth operation request R6 should be first processed, and thereafter that the first zone standby unit ZS1 storing the fourth operation request R4 should be next processed. Then, the sequence determining unit 134C generally determines the processing sequence on the basis of the zone information ZI and standby number SN. However, there is no zone standby unit to be processed. Therefore, the zone standby unit ZS1 is last processed.

Accordingly, the operation requests included in a third output request set ORS3 are sequentially provided from zones Z4 and Z1. Once the third output request set ORS3 is provided, the zone information ZI is updated to indicate the first zone standby unit ZS1 related to the last provided fourth operation request R4 (ZI=1).

Figure 14:
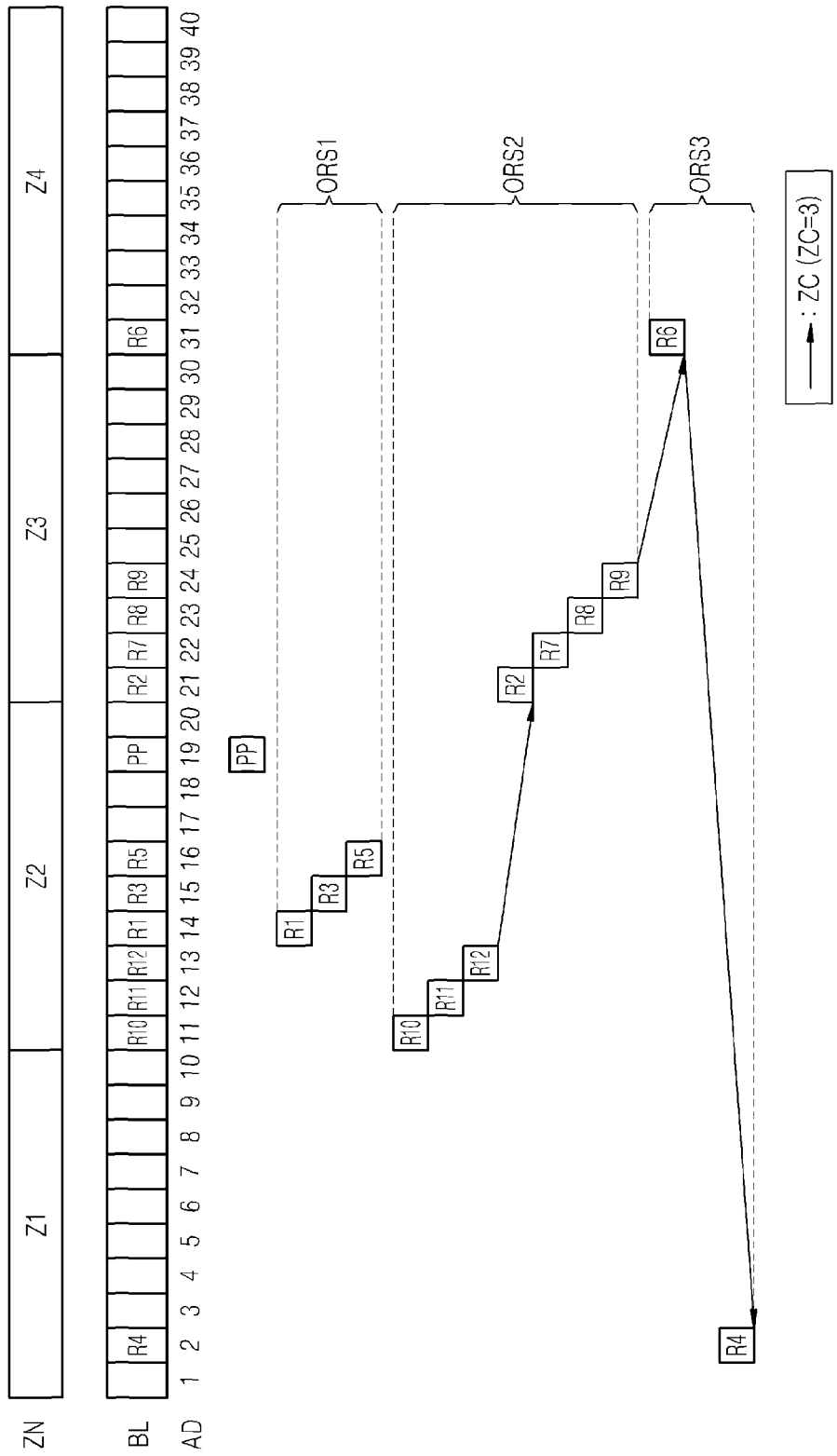
FIG. 14 further illustrates an execution sequence for request operations by the schedule of FIG. 9 as operated according to the scheduling method described in relation to FIGS. 11, 12 and 13.

FIG. 14 illustrates a sequence of operations performed by the memory of a memory device in response to the first, second and third output request sets provided by the scheduler 100C of FIGS. 11, 12 and 13.

Referring to FIG. 14, it is assumed that a beginning (or previous) position (PP) indicates a logical address for a block BL associated with a last performed operation before the first output request set ORS1 is provided has a value of 19. Therefore, in FIG. 11, the zone information ZI indicates the second zone standby unit ZS2 which corresponds to the second zone Z2.

The memory device performs operations in the second zone Z2 of the memory in response to operation requests included in the first output request set ORS1 (refer to FIG. 11). The memory device performs operations in the second zone Z2 of the memory, and then performs operations in the third zone Z3 in response to operation requests included in the second output request set ORS2 (refer to FIG. 12). This approach may be termed zone crossing (ZC) wherein a memory zone related to a performed operation is changed as described above. In FIG. 14, zone crossings are indicated by respective arrows.

Next, the memory device performs an operation in the fourth zone Z4, and performs an operation in the first zone Z1 in response to operation requests included in the third output request set ORS3 (refer to FIG. 13). In this case, the zone crossings occur between the third zone Z3 to the fourth zone Z4, as well as between the fourth zone Z4 to the first zone Z1.

Referring collectively to FIGS. 11 to 14, the scheduler 100C receives the first and second input request sets IRS1 and IRS2, and outputs the first, second and third output request sets ORS1, ORS2 and ORS3. An idle time interval among occur during the first to third output request sets ORS1 to ORS3. When the memory device performs operations on the memory in response to the first, second and third output request sets ORS1, ORS2 and ORS3, three different zone crossings occur in the illustrated example.

Figure 15:
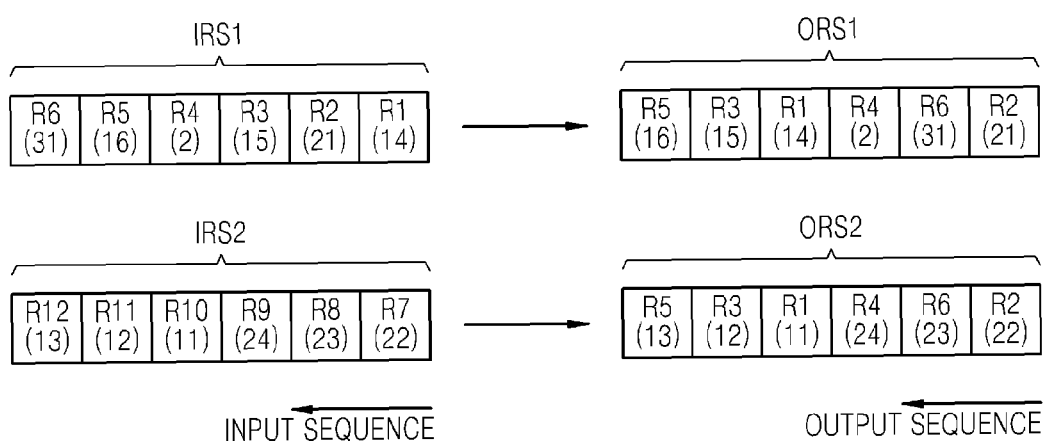
FIGS. 15 and 16 illustrate yet another scheduling method that may be performed by certain schedulers.
Figure 16:
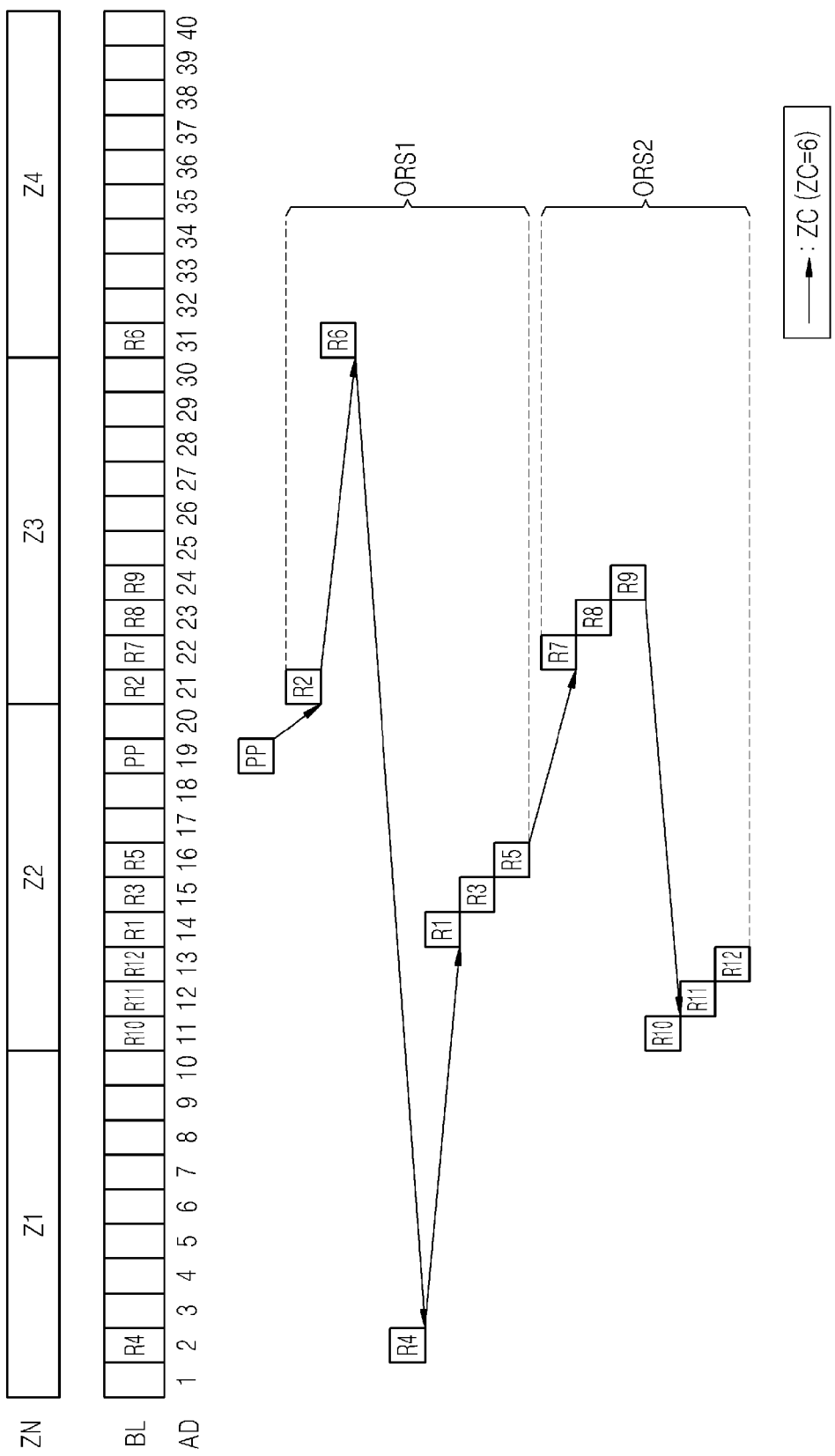

FIGS. 15 and 16 illustrate another scheduling method that may be used by certain schedulers.

Referring to FIGS. 15 to 16, a particular scheduler receives a first input request set IRS1 to output a first output request set ORS1, and receives a second input request set IRS2 to output a second output request set ORS2. The first input request set IRS1 is the same as the first input request set IRS1 of FIG. 11, except for the deadline information, and the second input request set IRS2 is the same as the second input request set IRS2 of FIG. 12. Also, it is assumed that a logical address associated with a previous position PP is 19 as in FIG. 14.

FIGS. 15 and 16 illustrate what may be understood as "an elevator approach". According to the elevator approach, the logical address AD is arranged in ascending order starting from the logical address AD of the previous position PP. If the logical address AD is increased to 40, the logical address AD is arranged in ascending order from 1.

Since it is assumed that the previous position PP is 19, the logical addresses AD, which are indicated by address information of operation requests, namely, first to sixth operation requests R1 to R6 included in the first input request set IRS1, are arranged in ascending order starting from 19 which is the logical address AD of the previous position (i.e., 21, 31, 2, 14, 15, and 16). According to the order of arranged logical addresses AD, the first output request set ORS1 is provided.

The logical addresses AD, which are indicated by address information of the plurality of operation requests, namely, seventh to twelfth operation requests R7 to R12 included in the second input request set IRS2, are arranged in ascending order starting from 16 which is the logical address AD of the fifth operation request R5 lastly outputted from the first output request set ORS1, i.e., 22, 23, 24, 11, 12, and 13. There may be a time interval between the first output request set ORS1 and the second output request set ORS2.

When the memory device performs operations on the memory MEM according to the first and second output request sets ORS1 and ORS2 to which the elevator approach is applied, a total of six zone crossing occurs.

Comparing FIG. 14 with FIG. 16, when the scheduling operation is performed using a scheduler according to certain embodiments of the inventive concept using a zone standby unit that corresponds with a particular memory zone, the number of required zone crossings may be reduced. This is because the spatial locality of the logical address AD for a plurality of operation requests included in an output request set ORS may be improved by using a zone standby unit.

In contrast, the elevator approach described with reference to FIGS. 15 and 16 is a scheduling method suitable for a hard disk drive (HDD) including an read/write head. In an HDD, the time taken for performing an operation in response to an operation request greatly varies with seek time taken to move the head. The elevator approach may be used for minimizing seek time in an HDD.

However, there is no head in a memory device such as an SSD including a flash memory. Therefore, there is little if any positive effect in applying the elevator approach. The time taken for performing an operation in response to operation requests of a memory device including a flash memory may be shortened by improving the spatial locality of the logical addresses between a plurality of operation requests as is described in some additional detail with reference to FIGS. 17 and 18.

Figure 17:
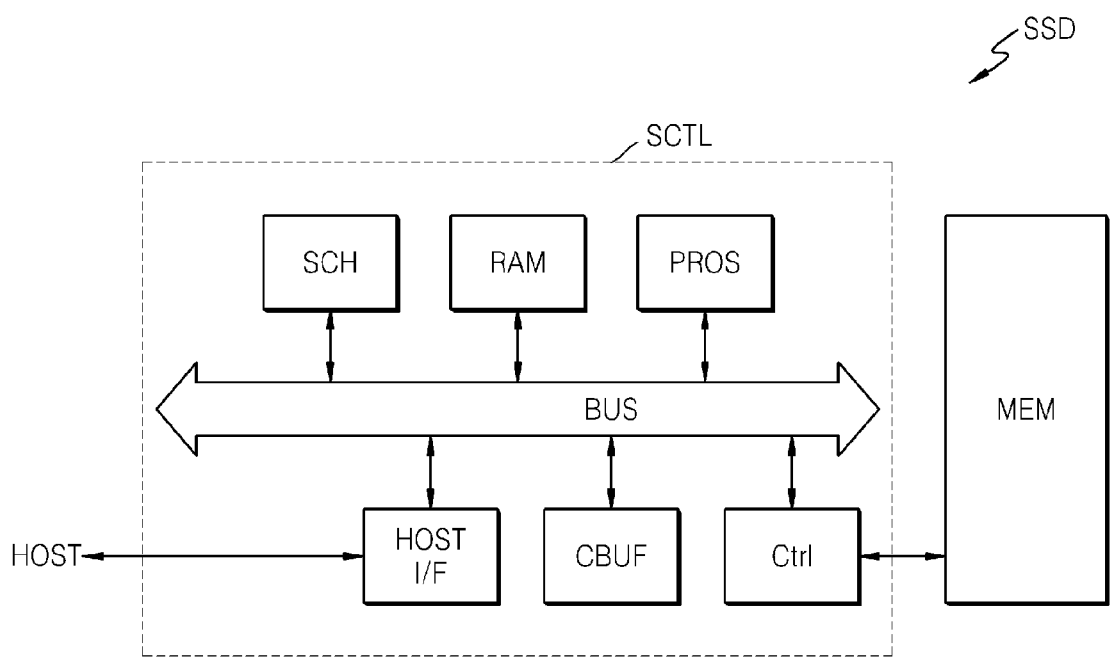
FIG. 17 is a diagram illustrating a solid state drive (SSD) that includes a scheduler according to an embodiment of the inventive concept.

FIG. 17 is a diagram illustrating an SSD that includes a scheduler according to an embodiment of the inventive concept.

Referring to FIG. 17, the SSD according to the illustrated embodiment of the inventive concept may include an SSD controller (SCTL) and a memory (MEM). The memory may be a flash memory.

The SSD controller may include a host interface (HOST I/F), a scheduler (SCH), a processor (PROS), a random access memory (RAM), a cache buffer (CBUF), and a memory controller (Ctrl) electrically connected via a bus (BUS).

The host interface HOST I/F may receive an operation request of a host (not shown) to transmit the received operation request to the scheduler SCH, or transmit data received from the memory MEM to the host. The host interface HOST I/F may interface with the host by using various interface protocols such as Universal Serial Bus (USB), Man Machine Communication (MMC), Peripheral Component Interconnect-Express (PCI-E), Serial Advanced Technology Attachment (SATA), Parallel Advanced Technology Attachment (PATA), Small Computer System Interface (SCSI), Enhanced Small Device Interface (ESDI), and Intelligent Drive Electronics (IDE).

The scheduler SCH receives an input request set from the host interface HOST I/F, and then schedules the input request set to output the scheduled input request set as an output request set. The scheduler SCH may transmit the output request set to the processor PROS. A structure and scheduling method of the scheduler SCH has already been described above.

The processor PROS controls the memory controller Ctrl to transmit/receive data to/from the memory MEM in response to operation requests included in the output request set outputted from the scheduler SCH. The scheduler SCH, processor PROS, and memory controller Ctrl of the SSD may be integrated into a single ARM processor. Information needed for operating the processor PROS may be loaded on the RAM. Data to be transmitted to the memory MEM, or data received from the memory MEM may be temporarily stored into the cache buffer CBUF. The cache buffer CBUF may be an SRAM or the like.

Figure 18:
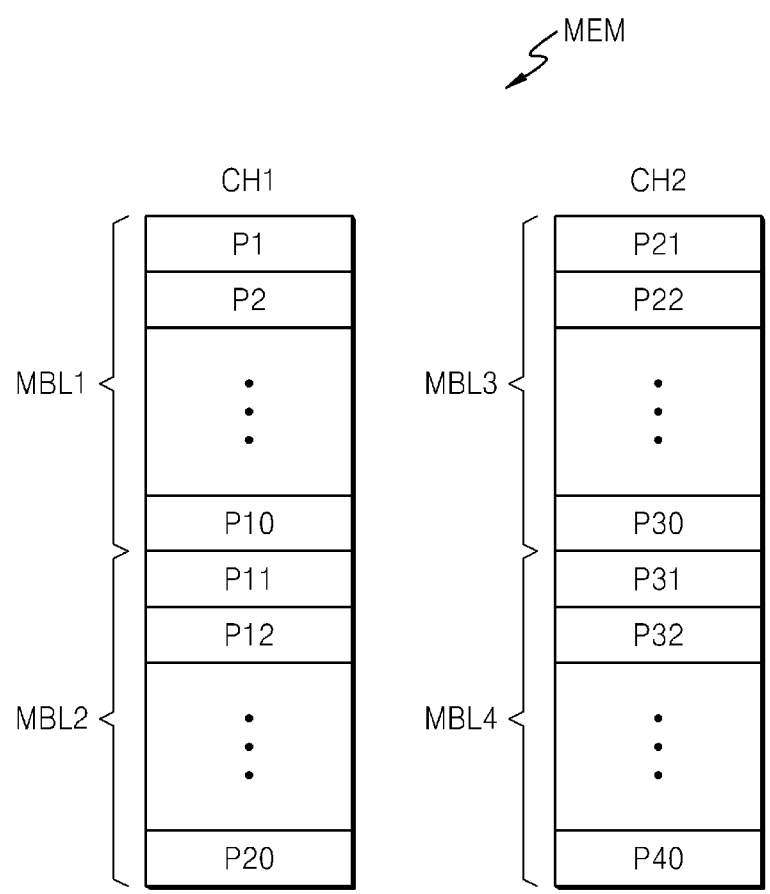
FIG. 18 illustrates one possible physical configuration for a memory operated in conjunction with a scheduler according to an embodiment of the inventive concept.

FIG. 18 illustrates one possible physical configuration for a memory associated with a scheduler according to an embodiment of the inventive concept.

Referring to FIG. 18, the memory MEM has a physical structure constituted of memory blocks MBL1 to MBL4 and pages P1 to P40. Also, the memory MEM may include a plurality of chips CH1 and CH2. The memory MEM of FIG. 18 may be a flash memory, and may be included in a memory device such as the SSD of FIG. 17.

FIG. 18 illustrates just one example of many different configurations including a number of chips CH, memory blocks MBL, and pages P within the memory MEM. The size or sizes of the memory block MBL and page P1 to P40 may be differently determined for each flash memory device. For instance, a flash memory, which has a total capacity of 16 megabytes, capacity of 16 kilobytes for each memory block MBL, and capacity of 512 bytes for each page P, is constituted of 1024 memory blocks MBL, each of which has 32 pages P.

Data write and read operations are performed on a per-page basis, and an electrical erase operation is performed on a per-block basis. Before the data write operation, the erase operation needs to be performed on the memory block MBL.

Referring to FIGS. 8 and 18, one logical block BL of the memory MEM may correspond to one physical page P. Also, the zones Z1 to Z4 of the memory MEM may be determined on the basis of size of the memory block MBL. For instance, the number of logical blocks BL included in one zone ZN of the memory MEM may be the same as the number of pages P included in one memory block MBL.

Referring to FIGS. 8, 17, and 18, for performing the data write and read operations in response to operation requests in the SSD, an address converting operation needs to be performed for converting the logical address AD indicated by address information into a physical address of the memory MEM. The address converting operation may be performed through a mapping table. The mapping table may be stored in the memory MEM, and may be loaded on the RAM.

A mapping method is classified into a page mapping method, block mapping method, and hybrid mapping method according to a unit of mapping.

A mapping operation is performed on a per-page basis according to the page mapping method, and is performed on a per-block basis according to the block mapping method. According to the hybrid mapping method, the plurality of memory blocks MBL1 to MBL4 included in the memory MEM are classified into a data block and a log block. The block mapping method is used for the data block, and the page mapping method is also used for the log block. The hybrid mapping method is also called a log block mapping method.

According to the page mapping method, the address converting operation is performed on a per-page basis. In this case, the mapping table may define one-to-one correspondence between a plurality of logical addresses AD and a plurality of physical addresses P1 to P40. Therefore, in the case of the page mapping method, a size of the mapping table is very large. However, due to the capacity of the RAM and for efficiency, a whole part of the mapping table may not be loaded on the RAM, but a sub mapping table may be loaded thereon. The sub mapping table includes just partial correspondences among a plurality of correspondences included in the mapping table. In other words, the sub mapping table is included in the mapping table.

A map hit means that the logical address AD of an operation request requiring an address conversion in the sub mapping table loaded on the RAM exists. If the map hit does not occur, a sub mapping table different from a previously loaded sub mapping table is loaded on the RAM. Whenever a different sub mapping table is loaded on the RAM, the performance of an operation request is delayed. If a map hit ratio is increased, the delay may be prevented so that the overall performance of the SSD may be improved.

The logical address AD defined in the sub mapping table may be a plurality of continuous logical addresses AD. Therefore, if spatial locality of the logical addresses AD is improved for a plurality of operation requests, the map hit ratio may be increased.

For instance, the sub mapping table may be loaded on the RAM on a per-zone basis. If the zone crossing occurs (refer to FIG. 14) when the sub mapping table is loaded on a per-zone basis, a sub mapping table different from the previously loaded sub mapping table is loaded on the RAM.

The scheduler according to an embodiment of the inventive concept may reduce the number of occurrences of zone crossings by improving the spatial locality of logical addresses for a plurality of operation requests included in an output request set. Therefore, the map hit ratio may be increased, and thus, the overall performance of the SSD may be improved.

According to the block mapping method, the address converting operation is performed on a per-block basis. When one zone ZN corresponds to one memory block MBL, the mapping table may define one-to-one correspondence between the plurality of zones Z1 to Z4 and the plurality of memory blocks MBL1 to MBL4. For instance, the mapping table may define that the zone Z2 corresponds to the memory block MBL4. The block BL which is included in the zone Z2 and has a logical address AD of 14 may correspond to a page P36 which is a fourth page of the memory block MBL4 due to offset. In this case, if the zone crossing occurs, the memory block is also changed. Thus, the chip CH may also be changed.

However, if the chip CH is changed, an access time of the memory MEM is delayed. Therefore, if the number of occurrences of zone crossings is reduced by improving spatial locality of logical addresses, the access time of the memory MEM may be shortened.

The scheduler according to an embodiment of the inventive concept may reduce the number of occurrences of zone crossings by improving the spatial locality of logical addresses for a plurality of operation requests included in an output request set. Therefore, the delay of the access time of the memory MEM may be prevented, and thus, the overall performance of the SSD may be improved.

According to the hybrid mapping method in which the block mapping method is used for a data block and the page mapping method is used for a log block, the log block and the data block may be interconnected using various methods. For instance, one log block may be interconnected with one data block, or a plurality of log blocks may be interconnected with a plurality of data blocks.

When an operation request is an overwrite request, data is written on a log block. Herein, the log block is a memory block allocated to be interconnected with the data block mapped to a logical address of the operation request. When an operation request is not an overwrite request but a write request, data may be written on a page in a data block mapped to a logical address of the operation request.

When data is overwritten, the page on which the data is overwritten in a log block becomes a valid page, and the page on which previous data prior to the overwrite operation is written becomes an invalid page.

If there is no available log block when the overwrite request occurs, the memory device may perform a merge operation. According to the merge operation, valid pages of a log block and valid pages of a data block are copied to another data block, and the log block and the data block are erased. According to the hybrid mapping method, invalid pages may be deleted by performing the merge operation. The deletion of invalid pages is called a garbage collection.

However, the copy of multiple pages and the erase of multiple memory blocks degrade the performance of a memory device. That is, a frequent merge operation may degrade the performance of a memory device.

According to certain embodiments of the inventive concept, spatial locality of logical addresses may be improved for a plurality of operation requests. If the spatial locality is improved, it is highly likely that logical addresses of a plurality of operation requests are mapped to the same data block. When an operation request is a write request, a page utilization ratio of a log block may be increased. If the page utilization ratio of a log block is increased, a newly allocable spare capacity of a log block is increased, and thus, a frequency of the merge operation may be decreased. Therefore, the performance of the SSD may be improved. Particularly, when one zone ZN corresponds to one memory block MBL, the page utilization ratio of a log block may be further increased.

Schedulers according to embodiments of the inventive concept may improve processing speed of the SSD by performing the scheduling operation by using a zone standby unit which corresponds to a zone ZN even though write operations occur with random logical addresses.

As described above, even though different mapping method may be used, the time taken for a memory device to perform an operation request may be shortened if spatial locality of logical addresses is improved for a plurality of operation requests. Therefore, the overall performance of a memory device may be improved.

Therefore, according to an embodiment of the inventive step, spatial locality of logical addresses may be improved for a plurality of operation requests by using a zone standby unit which corresponds to a zone of a memory. Therefore, a scheduler capable of efficiently scheduling a plurality of operation requests to a memory may be provided.

Although it is illustrated in FIG. 17 that the scheduler is included in the memory device, i.e., the SSD, the scheduler may be disposed outside of the memory device.

Figure 19:
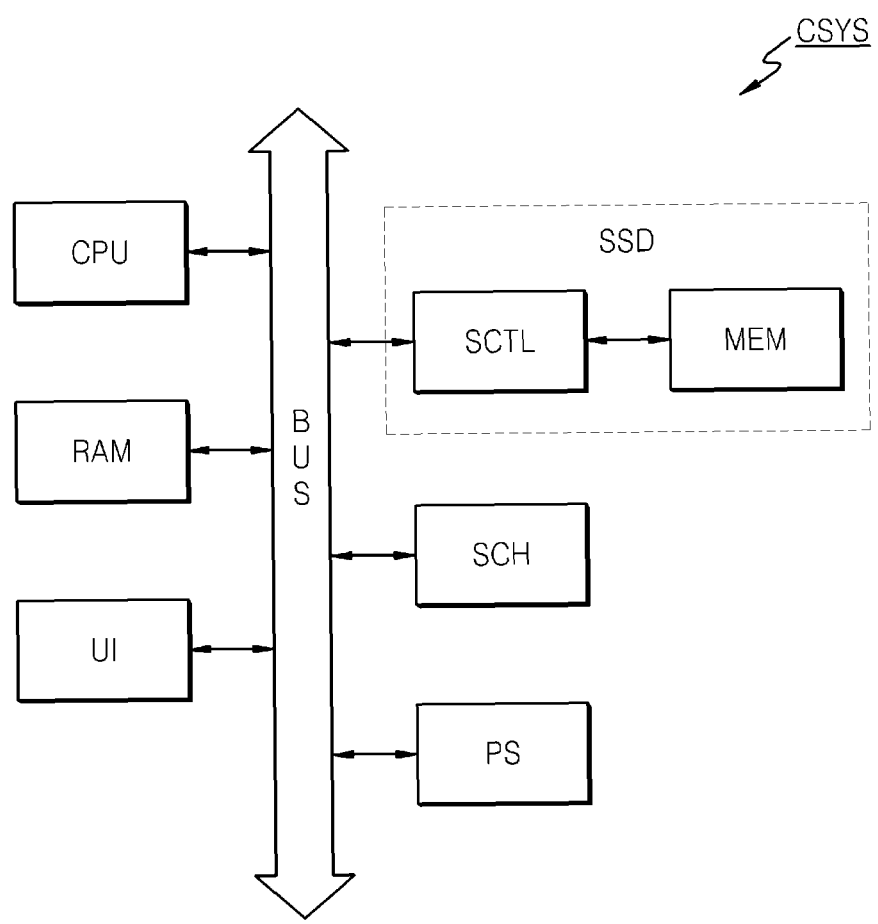
FIG. 19 is a block diagram illustrating a computational system including a memory and memory device (e.g., a SSD) that is operated using a scheduler according to an embodiment of the inventive concept.

FIG. 19 is a block diagram illustrating a computation system including a memory and memory device (e.g., a SSD) being operated by a scheduler according to an embodiment of the inventive concept.

Referring to FIG. 19, a computational system CSYS includes a scheduler SCH, a processor CPU, a user interface UI, and a SSD, which are electrically connected to a bus BUS. The SSD includes an SSD controller SCTRL and a memory MEM. Unlike the SSD of FIG. 17, the scheduler SCH is disposed outside of the SSD of FIG. 19. The scheduler SCH may transmit an output request set to the SSD. For instance, the SSD of FIG. 19 may be configured with the SSD of FIG. 17 without including the scheduler SCH.

The computational system CSYS may further include a power supply device PS. Also, the computational system CSYS may further include a system memory (e.g. RAM).

In the case that the computational system CSYS is a mobile device, a battery for supplying power to the mobile device and a modem such as a baseband chipset may be additionally provided. Also, it would be obvious to those skilled in the art that the computational system CSYS may further include an application chipset, a camera image processor (CIS), a mobile DRAM, and the like. Thus, detailed descriptions thereof are not provided.

Figure 20:
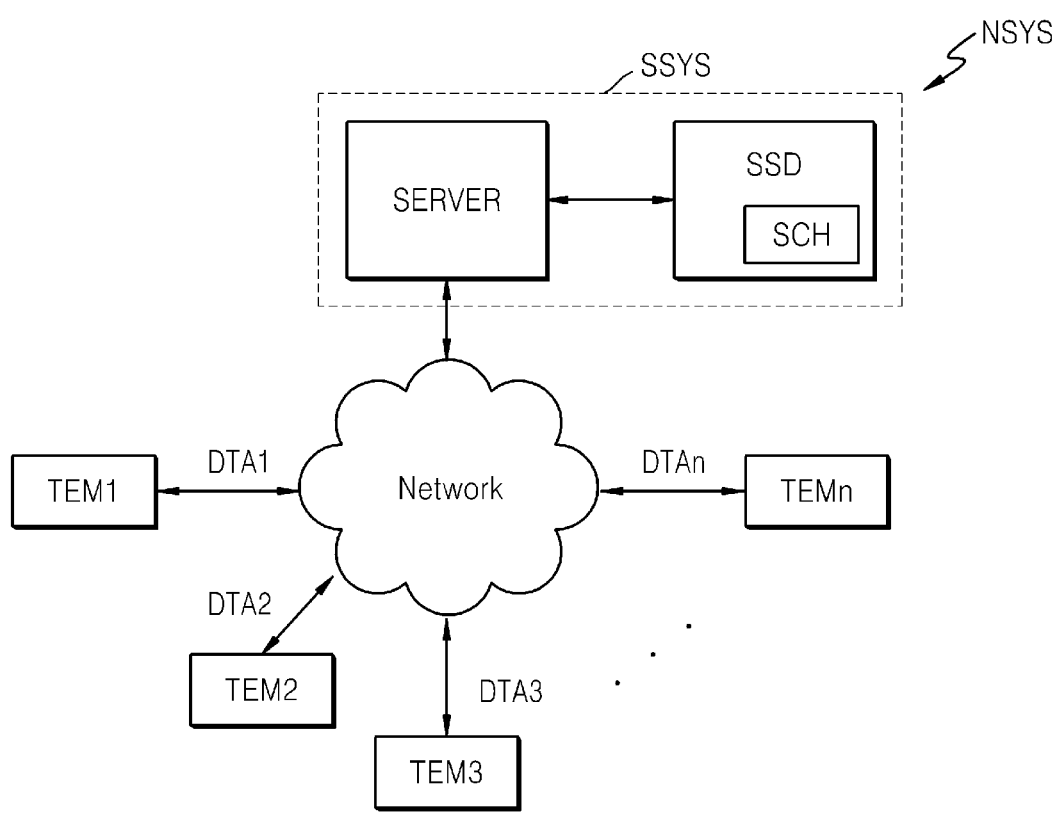
FIGS. 20 and 21 are block diagrams respectively illustrating network system(s) including a memory and memory device operated using a scheduler according to an embodiment of the inventive concept.
Figure 21:
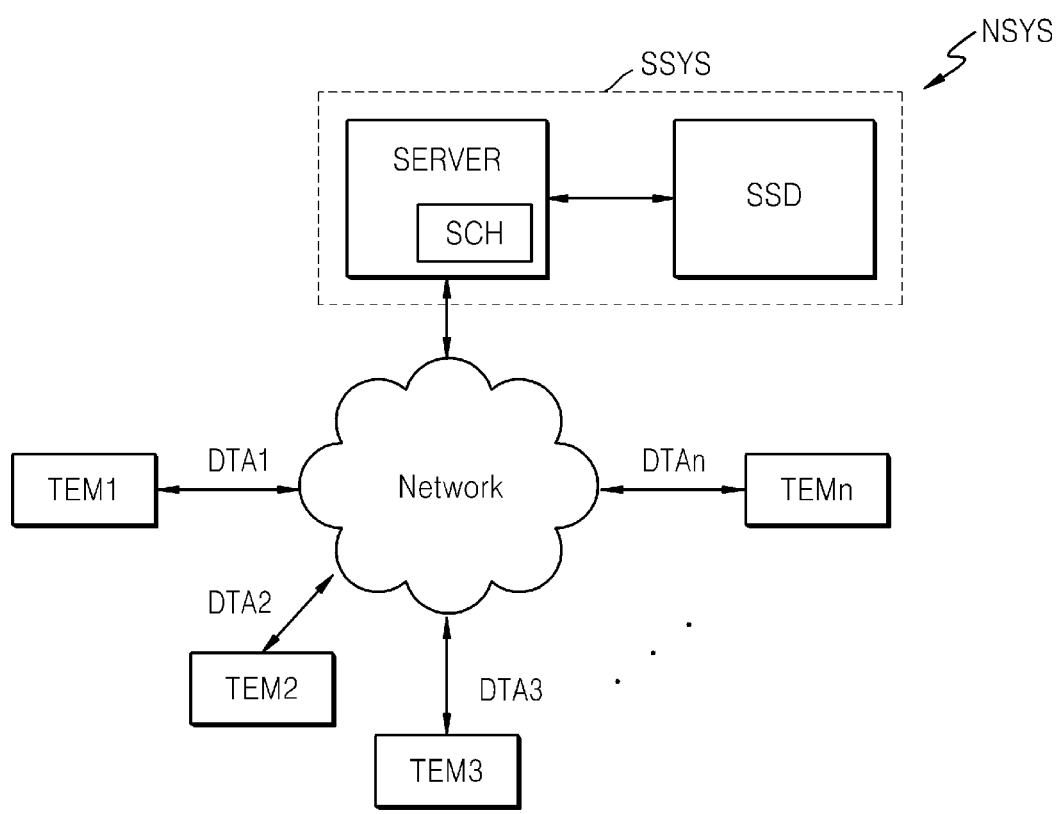

FIGS. 20 and 21 respective illustrate a network system NSYS including a scheduler SCH according to an embodiment of the inventive concept.

Referring to FIGS. 20 and 21, the network system NSYS may include a server system SSYS and a plurality of terminals TEM1 to TEMn connected to each other through a network. The server system SSYS may include a server, which processes requests received from the terminals TEM1 to TEMn, and a SSD, which stores data DTA1 to DTAn corresponding to the requests received from the terminals TEM1 to TEMn. The scheduler SCH according to an embodiment of the inventive concept may be included in the SSD (FIG. 20) or in the server (FIG. 21).

The SSD of FIG. 20 may be the SSD of FIG. 17.

The SSD of FIG. 21 may be configured with the SSD of FIG. 17 without including the scheduler SCH.

While the inventive concept has been particularly shown and described with reference to illustrated embodiments thereof, it will be understood that various changes in form and details may be made therein without departing from the scope of the following claims.

What is claimed is:

1. A scheduling method comprising:
   storing each of a plurality of operation requests received in an input request set within one of a plurality of zone standby units corresponding to a logical address identified by the operation request, each zone standby unit corresponding to one of a plurality of zones, each zone comprising multiple memory blocks, each of the memory blocks of each zone uniquely identified by a different logical address, and the memory blocks within a zone identified by neighboring logical addresses;
   determining a processing sequence of the operation requests stored in the plurality of zone standby units; and
   outputting an output request set comprising the operation requests arranged on the basis of the processing sequence,
   wherein the determining of a processing sequence of the operation requests stored in the plurality of zone standby units comprises:
   generating zone information indicating a lastly processed zone standby unit among a plurality of zone standby units in a previous output request set previously outputted before the output request set;
   generating, for each zone standby unit, a standby number indicating the number of operation requests stored in the zone standby unit; and
   generating the processing sequence on the basis of the zone information and the standby numbers.

2. The scheduling method of claim 1, wherein the determining of the processing sequence on the basis of the zone information and the standby numbers comprises determining that a zone standby unit indicated by the zone information is firstly processed.

3. The scheduling method of claim 2, wherein the determining of the processing sequence on the basis of the zone information and the standby numbers comprises determining the processing sequence according to a descending order of the standby numbers with respect to zone standby units except for the zone standby unit indicated by the zone information among the plurality of zone standby units.

4. The scheduling method of claim 3, wherein the determining of the processing sequence according to a descending order of standby numbers comprises determining the processing sequence according to the descending order of standby numbers that are larger than a reference value.

5. The scheduling method of claim 1, further comprising updating the zone information to indicate a lastly processed zone standby unit in the output request set.

6. The scheduling method of claim 1, wherein:
each of the operation requests comprises deadline information indicating a deadline of the operation request, and
the method further comprises determining the processing sequence on the basis of the deadline information.

7. The scheduling method of claim 1, further comprising:
dividing each zone standby unit, having a standby number that is larger than a first reference value, into a plurality of sub-zone standby units; and
merging zone standby units, which have standby numbers smaller than a second reference value and are adjacent to each other among the plurality of zone standby units, into one super zone standby unit.

8. The scheduling method of claim 7, wherein in the determining of the processing sequence on the basis of the zone information and the standby numbers, when the standby number of a first zone standby unit which is not divided nor merged among the plurality of zone standby units, the standby number of a second zone standby unit which is one of the plurality of sub-zone standby units and the standby number of the super zone standby unit are the same, the processing sequence is determined in the order of the second sub-zone standby unit, the first zone standby unit, and the super zone standby unit.

9. The scheduling method of claim 1, wherein:
each of the operation requests further comprises address information indicating a logical address, a write command, and data, and
for each operation request, the data is written on a memory block of the logical address indicated by the address information among the memory blocks in response to the operation request.

10. A scheduling method for a memory, the method comprising:
storing each of a plurality of operation requests received in an input request set within one of a plurality of zone standby units corresponding to a logical address identified by the operation request, each zone standby unit corresponding to one of a plurality of zones, each zone comprising multiple memory blocks, each of the memory blocks of each zone uniquely identified by a different logical address, and the memory blocks within a zone identified by neighboring logical addresses;
generating arrangement information needed to arrange the operation requests;
determining a processing sequence of the operation requests stored in the plurality of zone standby units, on the basis of the arrangement information; and
outputting an output request set comprising the operation requests arranged on the basis of the processing sequence,
wherein the generating of arrangement information needed to arrange the operation requests comprises:
extracting deadline information included in the operation requests;
generating zone information indicating a lastly processed zone standby unit among the plurality of zone standby units in a previous output request set previously outputted before the output request set; and
generating, for each of the zone standby units, a standby number indicating the number of operation requests stored in the zone standby unit.

11. The scheduling method for a memory of claim 10, wherein the memory blocks are a base unit on which each of the operation requests is performed.

12. The scheduling method for a memory of claim 10, wherein:
each of the operation requests comprises a write command, address information, and data,
for each operation request, the address information comprises a logical address of a zone which is an object of the operation request among the plurality of zones, and
the method further comprises, in order to perform an operation corresponding to each of the operation requests, performing the operation after converting the logical address to a physical address of memory corresponding to a zone that is an object of the operation request.

13. The scheduling method for a memory of claim 10, wherein the determining of the processing sequence of the operation requests comprises extracting an operation request facing an imminent deadline based on the deadline information, among the operation requests, and firstly processing the operation request facing the imminent deadline.

14. The scheduling method for a memory of claim 10, wherein the determining of the processing sequence of the operation requests comprises, when no operation request facing an imminent deadline is detected based on the deadline information, firstly processing an operation request stored in a zone standby unit indicated by the zone information.

15. The scheduling method for a memory of claim 10, wherein the determining of the processing sequence of the operation requests comprises, when it is determined that there is no operation request facing an imminent deadline among the operation requests, based on the deadline information, determining the processing sequence according to a descending order of the standby numbers with respect to the zone standby units, except for a zone standby unit indicated by the zone information among the plurality of zone standby units.

16. A scheduling method for a memory of an electronic device, the method comprising:
grouping memory blocks having neighboring addresses into a plurality of zones among multiple memory blocks corresponding to a virtual space;
storing each of a plurality of operation requests received in an input request set within one of a plurality of zone standby units corresponding to a logical address identified by the operation request, each zone standby unit corresponding to one of the plurality of zones, each zone comprising multiple memory blocks, each of the memory blocks of each zone uniquely identified by a different logical address, and the memory blocks within a zone identified by neighboring logical addresses;

determining a processing sequence of the operation requests stored in the plurality of zone standby units; and outputting an output request set comprising the operation requests arranged on the basis of the processing sequence, wherein the memory blocks are a base unit on which an operation according to each of the operation requests is performed, wherein the determining of the processing sequence of the operation requests stored in the plurality of zone standby units comprises:

detecting an operation request, among the operation requests, having an imminent deadline according to a reference time;

detecting a lastly processed zone standby unit among a plurality of zone standby units in a previous output request set previously outputted before the output request set; and detecting, for each zone standby unit, a standby number indicating the number of operation requests stored in the zone standby unit.

17. The method of claim 16, wherein each zone standby unit and a zone corresponding to the zone standby unit are dynamically allocated according to the standby numbers.

* * * * *